US012526950B2

(12) United States Patent
Lin

(10) Patent No.: US 12,526,950 B2
(45) Date of Patent: Jan. 13, 2026

(54) SUPPORT CAGE FOR AN ELECTRONIC MODULE OF AN INFORMATION PROCESSING DEVICE

(71) Applicant: HEWLETT PACKARD ENTERPRISE DEVELOPMENT LP, Spring, TX (US)

(72) Inventor: Yu Han Lin, Taipei (TW)

(73) Assignee: Hewlett Packard Enterprise Development LP, Spring, TX (US)

( * ) Notice: Subject to any disclaimer, the term of this patent is extended or adjusted under 35 U.S.C. 154(b) by 191 days.

(21) Appl. No.: 18/427,961

(22) Filed: Jan. 31, 2024

(65) Prior Publication Data

US 2025/0247988 A1    Jul. 31, 2025

(51) Int. Cl.
*H05K 7/14* (2006.01)
*G06F 1/18* (2006.01)

(52) U.S. Cl.
CPC .......... *H05K 7/1461* (2013.01); *G06F 1/183* (2013.01); *H05K 7/1402* (2013.01)

(58) Field of Classification Search
CPC .......... G06F 1/183; G06F 1/187; G06F 1/185; G06F 1/1658; G06F 1/184; G06F 1/1626; G06F 1/181; H05K 7/1461; H05K 7/1402; H05K 7/142; H05K 7/1418; H05K 7/1411; H05K 7/1417; H05K 7/1415; H05K 5/0039; H05K 5/0213; H05K 5/023; H05K 5/0221; H05K 5/026
See application file for complete search history.

(56) References Cited

U.S. PATENT DOCUMENTS

| | | | | |
|---|---|---|---|---|
| 5,584,396 A | * | 12/1996 | Schmitt | H02B 1/36 |
| | | | | 211/26 |
| 7,539,021 B2 | * | 5/2009 | Peng | H05K 9/00 |
| | | | | 361/752 |
| 7,679,896 B2 | * | 3/2010 | Deng | G06F 1/187 |
| | | | | 361/679.33 |
| 8,475,214 B2 | * | 7/2013 | Shtargot | G06F 1/183 |
| | | | | 439/638 |

(Continued)

FOREIGN PATENT DOCUMENTS

CN      112732627 A      4/2021

*Primary Examiner* — Abhishek M Rathod
(74) *Attorney, Agent, or Firm* — Hewlett Packard Enterprise Patent Department

(57) ABSTRACT

A support cage includes an outer frame having first vertical walls and a base including an engagement element, and an inner frame having a beam and second vertical walls. The electronic module is slidably disposed along the second vertical walls and detachably coupled to the inner frame. The inner frame is slidably disposed along the first vertical walls and detachably coupled to the outer frame. In an installed state of the inner frame to the outer frame and the electronic module to the inner frame: horizontal translation of the support cage along a first direction attaches the support cage to information processing device and electrically connects the electronic module to the information processing device, and horizontal translation of the support cage along a second direction opposite to the first direction releases the support cage from the information processing device and electrically disconnects the electronic module from the information processing device.

18 Claims, 16 Drawing Sheets

(56) References Cited

U.S. PATENT DOCUMENTS

| | | | |
|---|---|---|---|
| 9,888,607 B2* | 2/2018 | Van Pelt | H05K 7/1489 |
| 10,470,330 B1* | 11/2019 | Chen | G11B 33/025 |
| 11,200,920 B1* | 12/2021 | Chang | G11B 33/022 |
| 11,212,933 B2 | 12/2021 | Tsorng et al. | |
| 11,419,233 B2 | 8/2022 | Zhai et al. | |
| 2006/0171110 A1* | 8/2006 | Li | G11B 33/128 |
| 2008/0158810 A1* | 7/2008 | Liu | G06F 1/187 |
| 2009/0091884 A1* | 4/2009 | Walker | G06F 1/187 |
| | | | 361/679.33 |
| 2009/0104810 A1* | 4/2009 | Matsuzawa | H01R 13/631 |
| | | | 439/377 |
| 2010/0187957 A1* | 7/2010 | Liang | G06F 1/187 |
| | | | 312/223.2 |
| 2012/0162893 A1* | 6/2012 | Lin | G11B 33/128 |
| | | | 248/224.8 |
| 2020/0257348 A1 | 8/2020 | Wanner | |
| 2022/0121251 A1 | 4/2022 | Chang et al. | |

\* cited by examiner

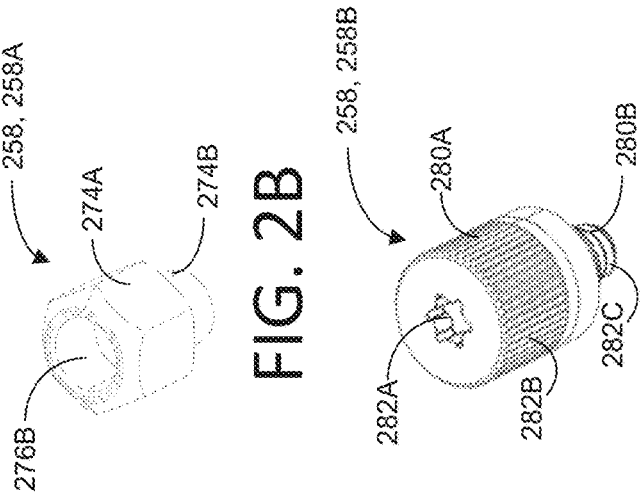
FIG. 2B
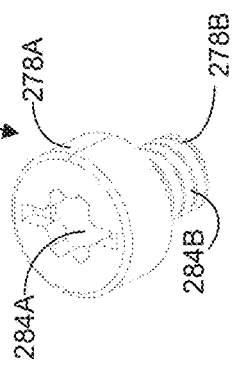
FIG. 2C
FIG. 2D
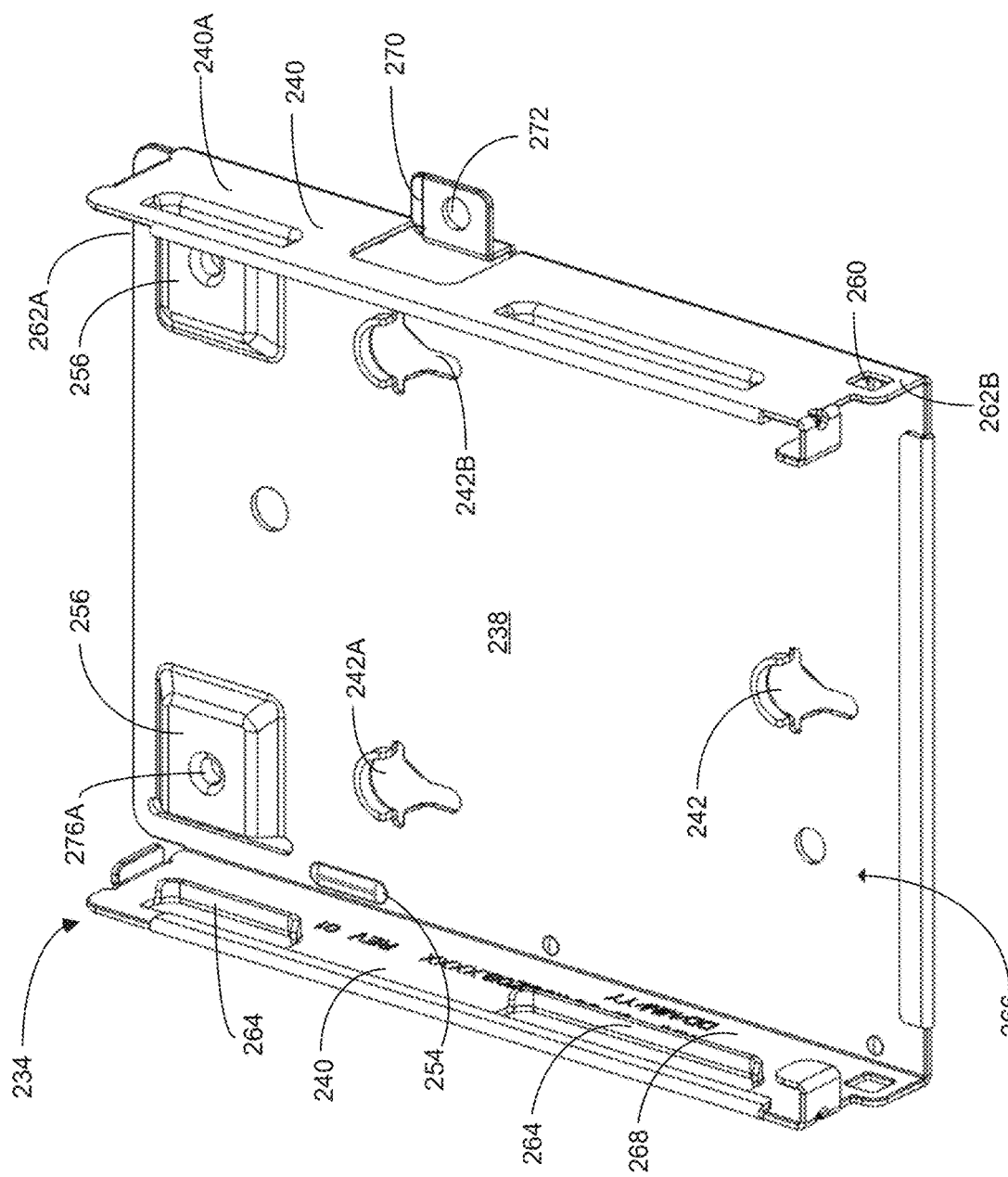
FIG. 2A

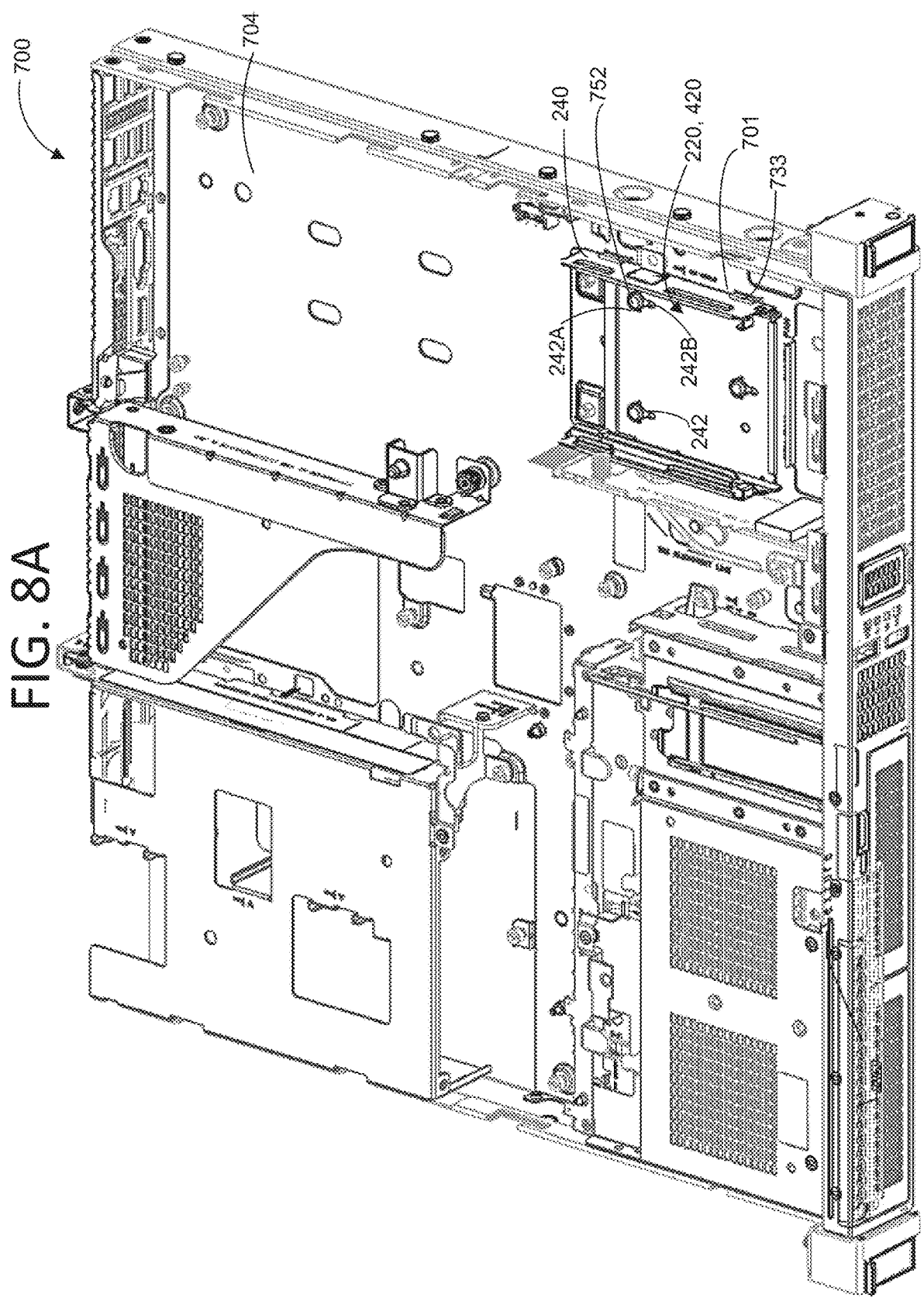

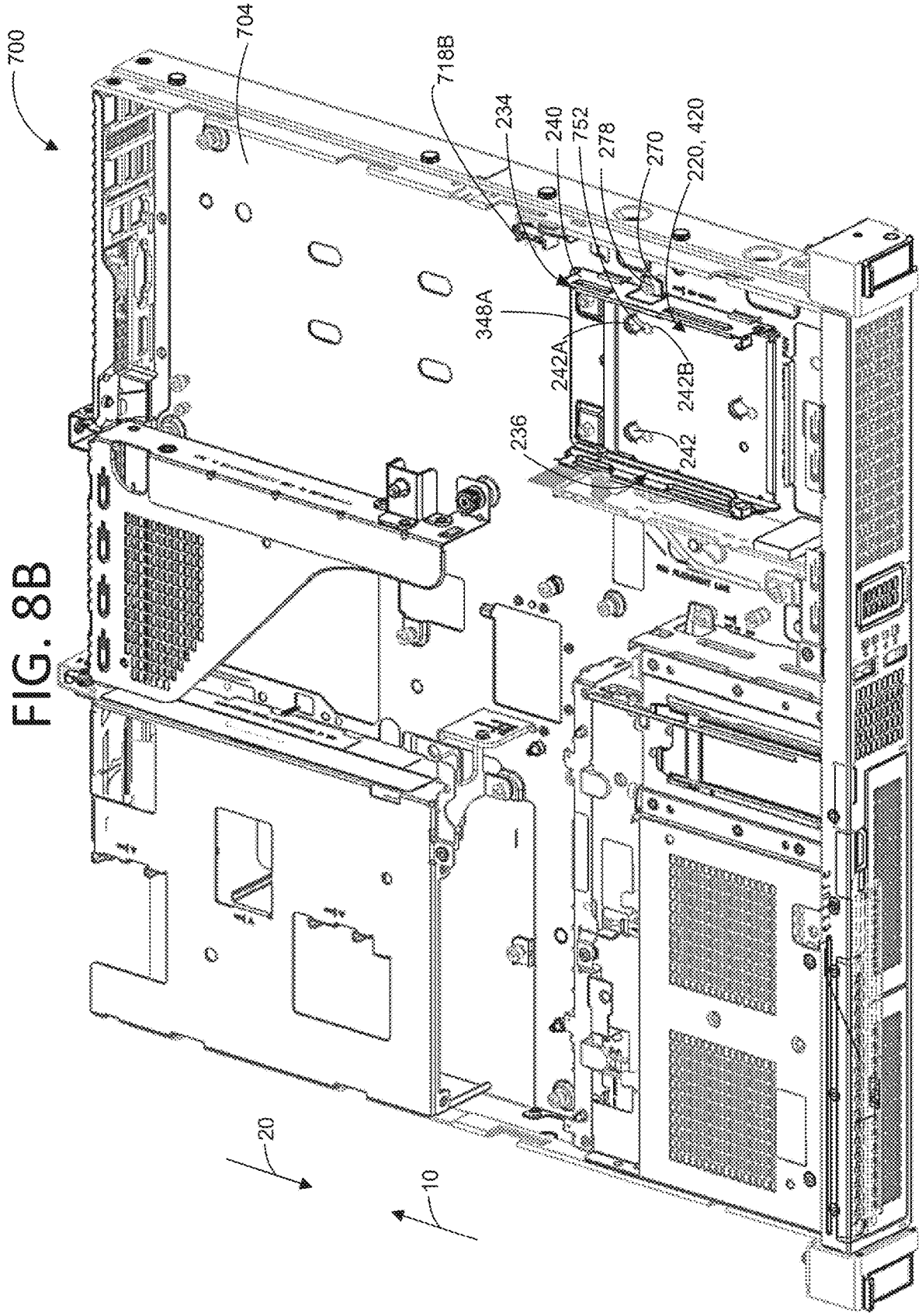

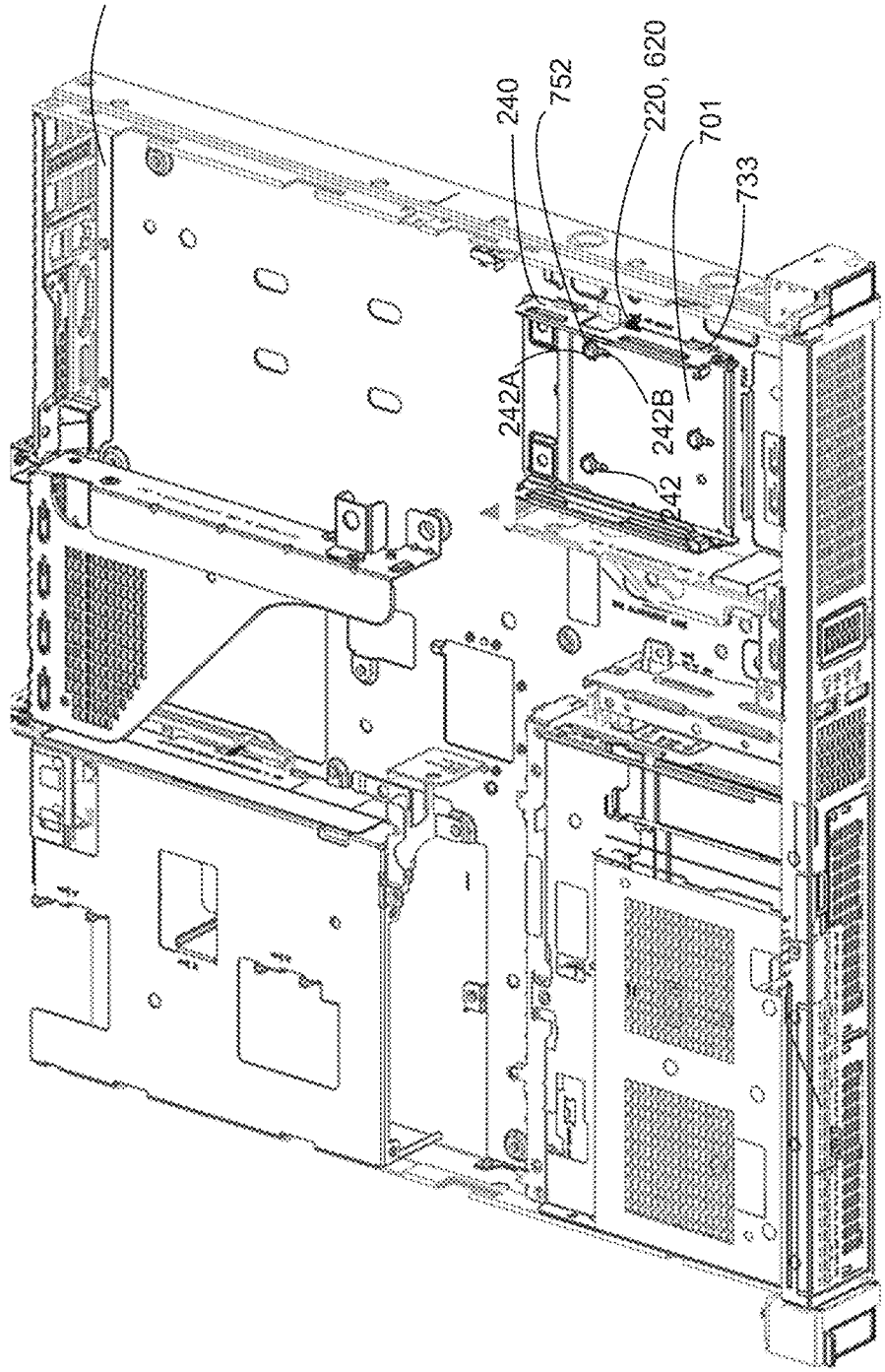

SUPPORT CAGE FOR AN ELECTRONIC MODULE OF AN INFORMATION PROCESSING DEVICE

BACKGROUND

An information processing device such as a computer, a networking device, or the like may include a primary system board (e.g., a motherboard or a host platform module) having electronic components such as central processor units, resistors, capacitors, or the like to provide some basic function. To expand the functionality of the information processing device, additional electronic modules such as an integrated circuit module, a storage module, an open compute platform (OCP) module, or the like may have to be detachably connected to the primary system board. Therefore, the primary system board may include connectors that can detachably connect with complementary connectors of such electronic modules, thereby establishing an electrical connection between the electronic modules and the information processing device and expanding the functionality of the information processing device.

BRIEF DESCRIPTION OF THE DRAWINGS

Various examples will be described below with reference to the following figures.

FIG. 2A illustrates a perspective side view of an outer frame according to an example of the present disclosure.

FIG. 2B illustrates a perspective side view of a first mounting fastener among a set of mounting fasteners according to an example of the present disclosure.

FIG. 2C illustrates a perspective side view of a second mounting fastener among a set of mounting fasteners according to an example of the present disclosure.

FIG. 2D illustrates a perspective side view of a mounting pin according to an example of present disclosure.

FIG. 8A illustrates a perspective side view of the support cage of FIG. 4C mounted on the information processing device of FIG. 7 according to an example of the present disclosure.

FIGS. 8B-8C illustrate perspective side views of the support cage of FIG. 8A attached to a chassis of the information processing device of FIG. 7 and the electronic module of FIG. 3 connected to a primary system board of the information processing device of FIG. 7 according to an example of the present disclosure.

FIG. 9A illustrates a perspective side view of the support cage of FIG. 6B mounted on the information processing device of FIG. 7 according to an example of the present disclosure.

DETAILED DESCRIPTION

Figure 1:
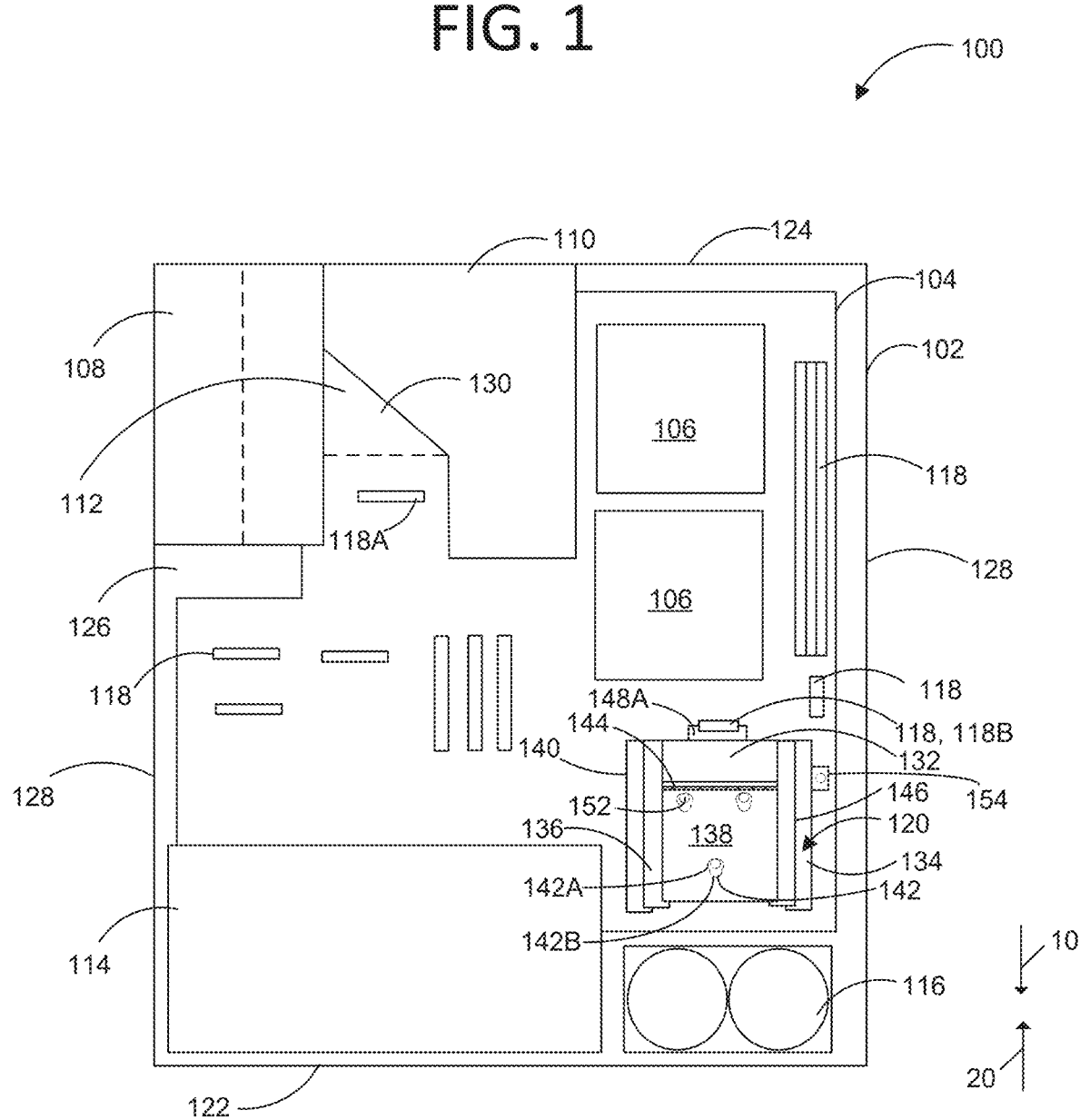
FIG. 1 illustrates a block diagram of an example information processing device according to an example of the present disclosure.

The following detailed description refers to the accompanying drawings. For purposes of explanation, certain examples are described with reference to the components illustrated in FIGS. 1-10. The functionality of the illustrated components may overlap, however, and may be present in a fewer or greater number of elements and components. Moreover, the disclosed examples may be implemented in various environments and are not limited to the illustrated examples. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

An information processing device generally includes a support structure disposed at a rear end of a chassis to receive removable electronic modules. For example, the support structure may define a bay for receiving the electronic module and connecting the received electronic module to the information processing device. In particular, the electronic module may be horizontally translated into the bay by inserting the electronic module through an opening defined in a rear panel of the chassis and an electrical connection may be established between the electronic module and the information processing device. Generally, the information processing device has space constraints at the rear end of the chassis due to the density of the electronic components disposed at the rear end. For example, certain electronic components such as power supply devices, storage drives, PCIe drives, a riser cage assembly, or the like are disposed adjacent to each other at the rear end. Hence, such electronic components may occupy substantial space at the rear end of the chassis, thereby providing a limited space to dispose certain other electronic components, such as an open compute program (OCP) module at the rear end of the chassis. In such cases, or even in cases where an additional OCP module is required to enhance the performance of the information processing device, an additional OCP module may need to be disposed in the middle region of the chassis rather than at the rear end of the chassis.

However, disposing an OCP module in the middle region of the primary system board can be challenging. One reason for this is that the OCP modules are generally designed to be mounted to horizontally extending supporting rails by positioning the OCP module horizontally adjacent to the rails and then sliding the OCP module horizontally onto the rails. This mounting method works fine for OCP modules disposed at the rear of the chassis, as the OCP modules can be positioned horizontally adjacent the rails while outside of the chassis. However, if this mounting method is used to mount the OCP module to mounting rails disposed in the middle portion of the system board, there may not be sufficient room around the rails to allow for the OCP module to be positioned horizontally adjacent to the rails prior to being slid onto the rails. Thus, in such cases, to allow for the mounting of the OCP module to the rails, the chassis, or a primary system board of the information processing device, may need to have a large keep-out zone adjacent to the rails to allow for large amounts of horizontal translation of the OCP module to dispose the electronic module within the bay and electrically connect with the information processing device. Since the chassis has space constraints, providing the large keep-out zone may restrict the usage of other electronic components in the information processing device.

Further, the OCP modules may be available in different form factors, hence providing a separate support structure for receiving several types of OCP modules may be cumbersome and expensive. Further, replacing the pre-installed OCP module with the new OCP module may be cumbersome, time-consuming, expensive, and depend on the availability of inventory of such a new compatible support structure. In addition, several types of support structures may need to be produced, and this may result in additional SKUs being needed and different inventory being maintained, which can in turn increase costs.

Additionally, coupling the OCP module disposed within the support structure may be extremely difficult. In particular, due to space constraints in the chassis, appropriate tools e.g., a screwdriver or the like cannot easily reach the location of the screws for fastening the OCP module to the support structure or releasing the OCP module from the support structure. Further, whenever an installation, maintenance, or replacement activity of the OCP module is planned in the information processing device, a user may handily require the screwdriver to unfasten the screws and release the OCP module from the support structure and fasten the screws to couple the OCP module to the support structure. Therefore, performing any of the installation, maintenance, or replacement activities of the OCP module in the information processing device may become extremely time-consuming and laborious.

A technical solution to the aforementioned problems includes providing a support cage that may be removably coupled to an electronic module (e.g., and OCP module) when the support cage is positioned exterior to an information processing device, and thereafter a combination of the support cage and the electronic module coupled therein may be disposed in and connected to the information processing device. The support cage is configured such that connecting the support cage and removable module to the information processing device entails horizontal translation across a very little distance (e.g., around 7 mm). In some examples, the electronic module is one which is designed to be mounted to rails by way of horizontal translation over a relatively long distance—for example, an OCP module which is designed to translate around 117 mm while being connected to support rails. However, because the electronic module can be attached to the support cage outside of the information processing device, rather than being attached to rails inside the information processing device, the long translation distance needed to mount the electronic module to the rails becomes irrelevant when it comes to determining keep out zones. Instead, only the short translation distance needed to connect the support cage may need to be considered for keep out zones. Thus, the support cage of the present disclosure may allow the electronic module to be provided in the middle region of the information processing device without requiring the large keep out zones which might otherwise be required if the electronic module were installed in a middle region using the standard rails. It may be noted that the middle region may correspond to a region within the chassis of the information processing device that is inaccessible for the insertion of the electronic module from the front or rear panels of the chassis.

In some examples, the support cage may include an outer frame with a base and two vertical walls. In such examples, the base may include one or more engagement elements (e.g., keyholes) that may engage with complementary engagement elements (e.g., spools) attached to a chassis or a primary system board of the information processing device to attach the support cage to the chassis or the primary system board. Thus, the engagement elements may allow the support cage to be removably coupled to the information processing device with very little horizontal translation. Therefore, the support cage of the present disclosure may allow the electronic module to be installed in the middle region of the information processing device without requiring the primary system board or the chassis to have a large keep-out zone to allow the electronic module to have a large amount of horizontal translation to electrically connect to the information processing device. The support cage also may further include an inner frame that may be removably coupled to the outer frame, with the inner frame having rails that are configured to receive and secure the electronic module by the horizontal translation of the electronic module into the rails of the inner frame.

Additionally, the inner frame may have ribs that may be configured to engage with grooves in the electronic module when the electronic module is disposed in the inner frame, thereby securing the electronic module to the inner frame. Accordingly, the electronic module may be removably installed in the inner frame without requiring any tools. Similarly, the inner frame may include a flange that may be configured to detachably couple to an opening in the outer frame when the inner frame is disposed in the outer frame, thereby securing the inner frame to the outer frame. Accordingly, the inner frame may be removably installed in the outer frame without requiring any tools. Further, the electronic module is easy to assemble, maintain, and replace, since the electronic module is installed in the inner cage, and a combination of the inner cage having the electronic module is installed in the outer frame, without using any tools, and only the outer frame of the support cage is fastened to the chassis or the primary system board. Thus, the support cage of the present disclosure may overcome the cumbersome and time-consuming process associated with, the installation, uninstallation, and reinstallation of the electronic module to the support cage.

In some examples, the outer frame may further include a first mounting fastener. In particular, the first mounting fastener may be coupled to the outer frame such that the first mounting fastener is aligned to an opening formed in the electronic module having a first form factor, when the inner frame having such electronic module is installed in the outer frame. In such examples, a second mounting fastener may be coupled to the first fastener to secure the electronic module to the support cage. In some other examples, the outer frame may not include the first mounting fastener and may only provide support to the electronic module having a second form factor and no opening. Accordingly, the outer frame having such a modular design may allow installation of the electronic module having either the first or second form factors to the same support cage. Thus, the support cage provides flexibility, serviceability, and benefits from the supply chain in terms of reducing the number of support cages that are needed in the inventory to install the electronic modules having different form factors.

Referring to the Figures, FIG. 1 depicts a block diagram of an information processing device 100 having a chassis 102, a primary system board 104, one or more processors 106, power supply units 108, a riser cage unit 110, an external electronic module 112 e.g., an external open compute platform (OCP) module, storage drives 114, one or more cooling units 116, and a support cage 120 of another electronic module 132 (or internal electronic module, e.g., an OCP module). It should be understood that FIG. 1 is not intended to illustrate specific shapes, dimensions, or other structural details accurately or to scale and that implementations of the information processing device 100 may have different numbers and arrangements of the illustrated components and may also include other parts that are not illustrated. The information processing device 100 may be a computer (e.g., a server, a storage device), a networking device (e.g., a switch, an access point), or the like.

The chassis 102 may be an enclosure of the information processing device 100 that is configured to house and support multiple electronic elements of the information processing device 100 such as the primary system board 104, the one or more processors 106, the power supply units 108, the riser cage unit 110, the external electronic module 112, the storage drives 114, and the electronic module 132. In some examples, the chassis 102 includes a front panel 122, a rear panel 124, a base 126, a pair of support walls 128, and a cover (not shown) that are connected to each other to define the enclosure therebetween. The primary system board 104 may be a circuit board such as a motherboard or a host platform module, of the information processing device 100 that is configured to assist the electronic elements in performing essential tasks like computing, communicating, and transferring data. In some examples, the primary system board 104 is disposed on and coupled to the base 126 of the chassis 102. The primary system board 104 includes one or more electrical connectors 118 (or one or more complementary or second electrical connectors) which are configured to connect with one or more corresponding electrical connectors (or one or more first electrical connectors, not shown) to establish an electrical connection with the electronic elements of the information processing device 100. In some examples, the one or more complementary electrical connectors 118 may include peripheral component interconnect express (PCIe) connectors, 4C+ connectors, 4C connectors, sockets, or the like. The one or more processors 106 may be a central processing unit (CPU) or a graphics processing unit (GPU) that is configured to process data, store data, and output results. In some examples, each of the one or more processors 106 is mounted on a corresponding complementary electrical connector 118 such as the socket, and electrically connected to the primary system board 104. Similarly, each of the power supply units 108 is a power circuitry that is configured to convert mains AC power to low voltage regulated DC power for the electronic elements of the information processing device 100. In some examples, the power supply units 108 are disposed at the rear panel 124 of the chassis 102 and configured to connect with the corresponding complementary electrical connectors 118, such as power sockets to supply the low voltage power to the electronic elements of the information processing device 100. Further, the riser cage unit 110 is a support structure that is configured to support a riser card and provide the primary system board 104 with an option for adding expansion cards to the information processing device 100. The external electronic module 112 is a Networking (Ethernet) module that is configured to allow the information processing device 100 to establish a connection with a removable electronic module such as a transceiver. In some examples, the external electronic module 112 and the riser cage unit 110 may be positioned at the rear panel 124 and disposed one above another on the chassis 102. In particular, the external electronic module 112 may be disposed in a bay 130 defined by a support structure (not labeled) located at the rear panel 124 by allowing the external OCP module to be inserted via an opening (not shown) defined in the rear panel 124. In such examples, when the external electronic module 112 is disposed in the bay 130, the external electronic module 112 may establish an electrical connection with at least one complementary connector 118A such as 4C or 4C+ connectors of the one or more complementary electrical connectors 118. Since the external electronic module 112 is disposed through the rear panel 124 there is no requirement to have a large keep-out zone in the chassis 102 or the primary system board 104 to allow for large amounts of horizontal translation of the external electronic module 112 to allow the external electronic module 112 to be disposed within the bay 130 and electrically connect with the information processing device 100. The storage drives 114 may be configured to store the data e.g., raw or processed data in the information processing device 100. The storage drives 114 are positioned at the front panel 122 of the chassis 102. In some examples, the storage drives 114 may be SATA, PATA, SCSI, or SSD drives. The one or more cooling units 116 are configured to cool the electronic elements of the information processing device 100 by providing cooling fluid to the electronic elements. The one or more cooling units 116 are disposed at the front panel 122. In some examples, the one or more cooling units 116 may be a fan, a cooler, or the like.

In some examples, the support cage 120 is disposed within the chassis 102. In particular, the support cage 120 is positioned in a middle region e.g., between the front panel 122 and the rear panel 124 of the chassis 102 and disposed on the primary system board 104 of the information processing device 100. In some examples, the support cage 120 includes an electronic module 132 e.g., an OCP module, an outer frame 134, and an inner frame 136. The outer frame 134 includes a base 138 and a set of first vertical walls 140 coupled to the base 138. In some examples, the base 138 of the outer frame 134 includes engagement elements 142 e.g., keyholes. In some examples, each of the engagement elements 142 includes a first hole portion 142A having a first diameter and a second hole portion 142B having a second diameter smaller than the first diameter. In the example of FIG. 1, the base 138 includes three engagement elements 142. The inner frame 136 includes a beam 144 and a set of second vertical walls 146 coupled to the beam 144. The electronic module 132 includes an electrical connector 148A (or a first electrical connector) and a body (not labeled) having electronic components disposed therein and connected to the electrical connector 148A. In some examples, the information processing device 100 further includes complementary engagement elements 152 e.g., spools. In some examples, at least one of the chassis 102 or the primary system board 104 may include the complementary engagement elements 152. In the example of FIG. 1, the primary system board 104 includes the complementary engagement elements 152. In some examples, each of the complementary engagement element 152 has a third diameter that is equal to the second diameter of the second hole portion 142B of the corresponding engagement element 142.

The support cage 120 may be assembled by first installing the electronic module 132 to the inner frame 136. In some examples, the electronic module 132 is configured to slidably disposed in the inner frame 136. For example, the set of second vertical walls 146 is configured to slidably receive a portion of the electronic module 132 upon a horizontal translation of the electronic module 132 into the inner frame 136 to removably install the electronic module 132 in the inner frame 136. Later, the inner frame 136 is installed in the outer frame 134 to complete the assembly of the support cage 120. In some examples, the inner frame 136 having the electronic module 132 installed therein, is slidably disposed in the outer frame 134. For example, the outer frame 134 is configured to slidably receive the inner frame 136 be detachably couple the inner frame 136 to the outer frame 134. In particular, the set of first vertical walls 140 is configured to receive the set of second vertical walls 146 to removably install the inner frame 136 in the outer frame 134 and complete the assembly of the support cage 120 including the electronic module 132 installed therein.

To attach the support cage 120 to the information processing device 100, the support cage 120 having the electronic module 132 installed in the inner frame 136 and the inner frame 136 installed in the outer frame 134 is disposed on the primary system board 104 such that the first hole portion 142A of each engagement element 142 contacts the corresponding complementary engagement element 152. Further, the support cage 120 is horizontally translated to detachably couple the support cage 120 to the information processing device 100. For example, the outer frame 134 of the support cage 120 is horizontally translated relative to the information processing device 100 such that the engagement element 142 is engaged with from the complementary engagement element 152 of the information processing device to detachably couple the support cage 120 to the information processing device 100. In particular, in an installed state of the inner frame 136 to the outer frame 134 and the electronic module 132 to the inner frame 136: a horizontal translation of the support cage 120 along a first direction 10 attaches the support cage 120 to the information processing device 100 by engaging the engagement element 142 with the complementary engagement element 152 and connects the electrical connector 148A of the electronic module 132 to a complementary electrical connector 118B (or a second electrical connector) among the one or more complementary electrical connectors 118 of the information processing device 100. In particular, the outer frame 134 is horizontally translated along the first direction 10 such that the complementary engagement element 152 is engaged to the second hole portion 142B of the engagement element 142 to attach the support cage 120 to the information processing device 100.

Since the electronic module 132 is removably installed when the electronic module 132 is positioned exterior to the information processing device 100, and further since the support cage 120 is horizontally translated to a very little distance (e.g., around 7 mm) to attach the support cage 120 to the information processing device 100 and to electrically connect the electronic module 132 to the information processing device 100, the chassis 102 or the primary system board 104 may not require to have a large keep-out zone at the middle region to allow for large amounts of horizontal translation of the electronic module 132 to electrically connect with the information processing device 100. Thus, the support cage 120 of the present disclosure may allow the electronic module 132 to be provided in the middle region of the information processing device 100 and to be electrically connected to the information processing device 100 without requiring the electronic module 132 to be horizontally translated for a large distance (e.g., around 117 mm) in the information processing device 100 to electrically connect to the information processing device 100. Further, the electronic module 132 disposed in the middle region of the chassis 102 may help in enhancing the performance of the information processing device 100. Further, at least one wall of the set of first vertical walls 140 includes a mounting element 154 configured to be coupled to the information processing device 100 to secure the support cage 120 to the information processing device 100.

To remove the support cage 120 from the information processing device 100, the mounting element 154 of the support cage 120 is first decoupled from the information processing device 100. Further, the support cage 120 is horizontally translated to detachably couple the support cage 120 from the information processing device 100. For example, the outer frame 134 of the support cage 120 is horizontally translated relative to the information processing device 100 such that the engagement element 142 is disengaged from the complementary engagement element 152 of the information processing device 100 to detachably couple the support cage 120 to the information processing device 100. In particular, in an installed state of the inner frame 136 to the outer frame 134 and the electronic module 132 to the inner frame 136: a horizontal translation of the support cage 120 along a second direction 20 opposite to the first direction 10 releases the support cage 120 from the information processing device 100 by disengaging the engagement element 142 from the complementary engagement element 152 and disconnects the electrical connector 148A from the complementary electrical connector 118B. In particular, the outer frame 134 is horizontally translated along the second direction 20 such that the complementary engagement element 152 disengages from the second hole portion 142B of the engagement element 142 and contacts the first hole portion 142A of the engagement element 142, thereby allow the support cage 120 to be released from the information processing device 100. Later, the support cage 120 may be lifted from the information processing device 100 to remove the support cage 120 from the information processing device 100. Further, the inner frame 136 may be detached from the outer frame 134 and the electronic module 132 may be detached from the inner frame 136.

Figure 7:
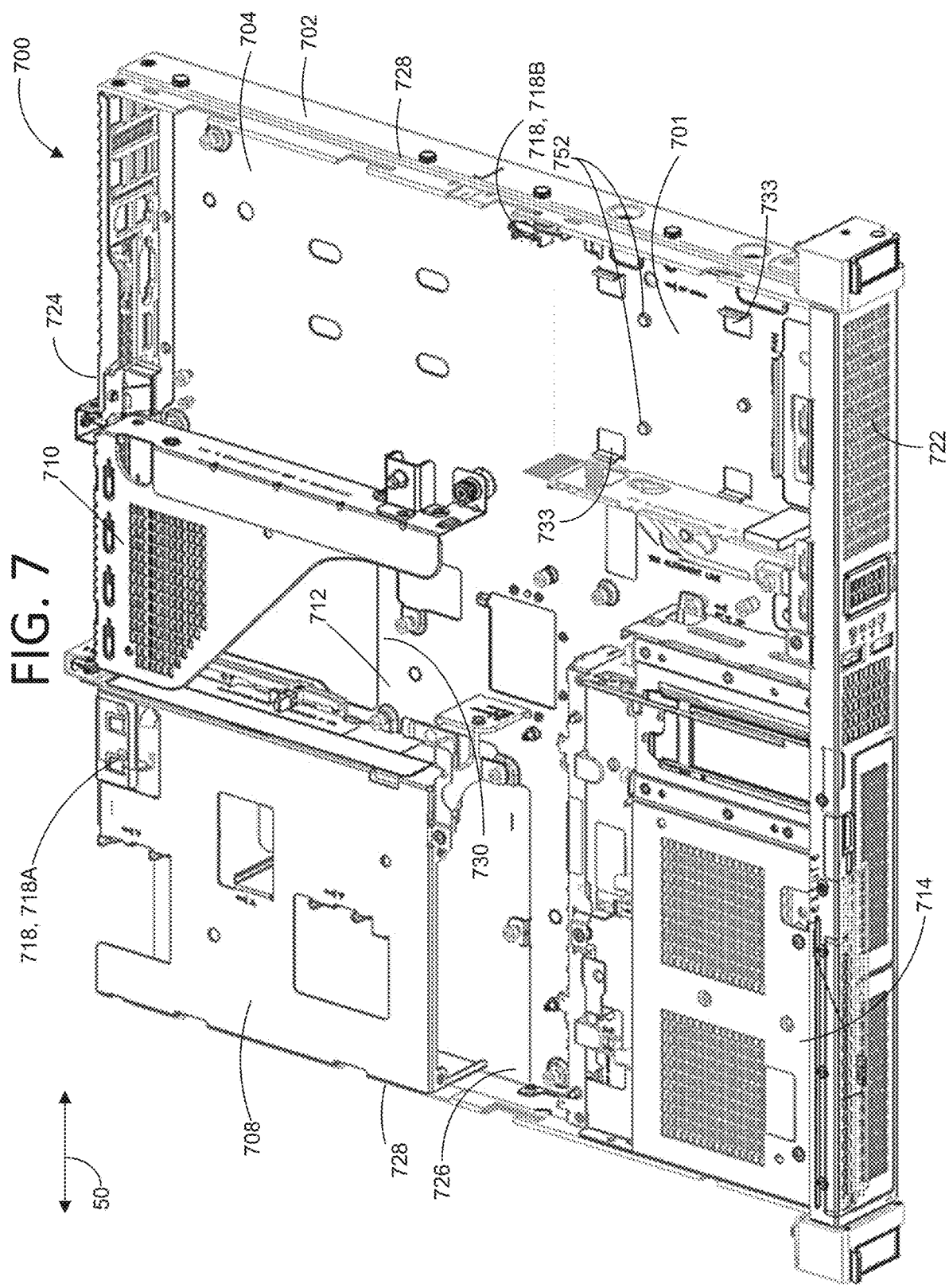
FIG. 7 illustrates a perspective side view of an information processing device according to an example of the present disclosure.

Referring to Figures, FIG. 2A depicts a perspective view of an outer frame 234 of a support cage 220 (see FIGS. 4C and 6B) of an information processing device 700 (as shown in FIG. 7). FIG. 2B depicts a perspective side view of a first mounting fastener 258A among a set of mounting fasteners 258 of the outer frame 234. FIG. 2C depicts a perspective side view of a second mounting fastener 258B among the set of mounting fasteners 258 of the outer frame 234. FIG. 2D depicts a perspective side view of a mounting pin 278 of the outer frame 234. In the description hereinafter, FIGS. 2A-2D are described concurrently for ease of illustration.

In some examples, the outer frame 234 includes a base 238 and a set of first vertical walls 240 coupled to the base 238. Each vertical wall of the set of first vertical walls 240 is coupled at a right angle to a corresponding end portion of the base 238 to define a frame mounting bay 266 therebetween.

The base 238 includes a set of engagement elements 242 (or a set of second engagement elements such as keyholes), a set of vertical ridges 254, and a set of mounting features 256. Each engagement element of the set of engagement elements 242 includes a first hole portion 242A having a first diameter and a second hole portion 242B having a second diameter smaller than the first diameter. Further, each vertical ridge of the set of vertical ridges 254 is disposed adjacent to a corresponding vertical wall of the set of first vertical walls 240. In some examples, each vertical ridge of the set of vertical ridges 254 may be configured to elevate a vertical height of an element disposed therein and in-parallel provide support to such disposed element. Further, each mounting feature of the set of the set of mounting features 256 is disposed proximate to a distal end 262A of a corresponding vertical wall of the set of first vertical walls 240. Each mounting feature 256 may be configured to provide support (directly or indirectly) to an electronic module 232 (as shown in FIGS. 4A and 6A) disposed therein on the base 238. Further, each mounting feature 256 includes an opening 276A that may be configured to optionally engage with the first mounting fastener 258A among the set of mounting fasteners 258.

Figure 2E:
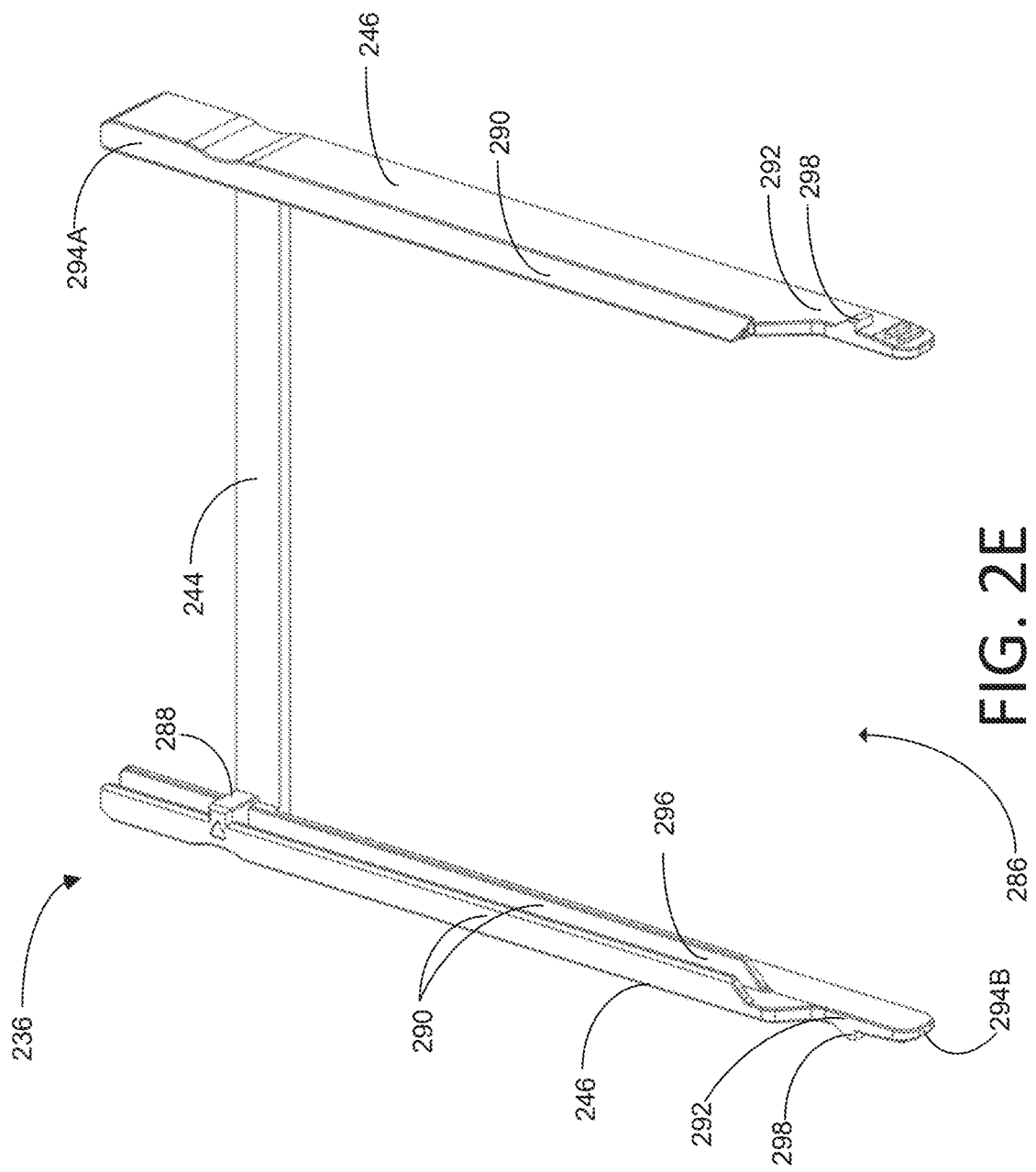
FIG. 2E illustrates a perspective side view of an inner frame according to an example of the present disclosure.

Each vertical wall of the set of first vertical walls 240 includes an opening 260 defined at a proximal end 262B of the corresponding first vertical wall 240. The opening 260 is configured to engage with a flange of the inner frame 236 (as shown in FIG. 2E) to secure the inner frame 236 to the outer frame 234. Further, each vertical wall of the set of first vertical wall 240 includes a pair of horizontal support walls 264 disposed at a pre-defined height (not labeled) from the base 238 and protruding towards a mutually opposite first vertical wall 240. In such examples, the pair of horizontal support walls 264 in each vertical wall of the set of first vertical walls 240 and the base 238 define a frame holding rail 268. In some examples, the frame holding rails 268 defined by the set of first vertical walls 240 may be configured to slidably receive the inner frame 236 upon horizontal translation of the inner frame 236 into the frame mounting bay 266 via the proximal end 262B. Further, one vertical wall 240A of the set of first vertical walls 240 includes a mounting element 270 having a hole 272, protruding away from the mutually opposite first vertical wall 240. The mounting element 270 may be configured to be coupled to a chassis (not shown) of the information processing device 700 to secure the support cage 220 to the information processing device 700.

The first mounting fastener 258A includes a head portion 274A and a body portion 274B coupled to the head portion 274A. The head portion 274A includes a hole 276B having internal threads which are configured to receive the second mounting fasteners 258B. The first mounting fastener 258A may be mounted on the opening 276A in a corresponding mounting feature of the set of mounting features 256 in the outer frame 234 and the head portion 274A may be rotated to couple the body portion 274B of the first mounting fastener 258A to the opening 276A in the corresponding mounting feature 256 of the outer frame 234.

The second mounting fastener 258B includes a head portion 280A and a body portion 280B coupled to the head portion 280A. The head portion 280A includes a shaped hole 282A at a top surface and a patterned side 282B at a peripheral surface. The body portion 280B includes threads 282C. The shaped hole 282A may be configured to engage with a complementary shaped driver to allow the second mounting fastener 258B to be rotated by the driver. Alternately, the patterned side 282B may be gripped to rotate the second mounting fastener 258B. In some examples, the second mounting fastener 258B may be mounted on and coupled to a corresponding mounting fastener of the set of first mounting fastener 258A to secure the electronic module 232 to the support cage 220.

The mounting pin 278 includes a head portion 278A and a body portion 278B coupled to the head portion 278A. The head portion 280A includes a shaped hole 284A at a top surface and the body portion 278B includes threads 284B. The shaped hole 284A may be configured to engage with a complementary shaped driver to allow the mounting pin 278 to be rotated by the driver. In some examples, the mounting pin 278 may be configured to couple the support cage 220 to the chassis of the information processing device 700.

Referring to Figures, FIG. 2E depicts a perspective view of an inner frame 236 of a support cage 220 of an information processing device 700 (as shown in FIG. 7). In some examples, the inner frame 236 includes a beam 244 and a set of second vertical walls 246 coupled to the beam 244. Each vertical wall of the set of second vertical walls 246 is coupled at a right angle to a corresponding end portion of the beam 244 to define a module mounting bay 286 therebetween.

In some examples, the inner frame 236 is a flexible frame that is configured to bend to removably install the electronic module 232 in the inner frame 236. In particular, the beam 244 and the set of second vertical walls 246 are made of a flexible member such as an Acrylonitrile butadiene styrene material.

Each vertical wall of the set of second vertical walls 246 includes a rib 288, a pair of horizontal support walls 290, and a handle 292. In some examples, the rib 288 is disposed proximate to a distal end 294A of a corresponding second vertical wall 246 and aligned above the beam 244. Further, each rib 288 protrudes towards a mutually opposite second vertical wall 246. In some examples, the rib 288 is configured to engage with a corresponding groove (not shown) in the electronic module 232 to secure the electronic module 232 to the inner frame 236. Further, the pair of horizontal support walls 290 in each second vertical wall 246 defines a module engagement rail 296. In some examples, the module engagement rails 296 defined by the set of second vertical walls 246 may be configured to slidably receive the electronic module 232 upon horizontal translation of the electronic module 232 into the module mounting bay 286 via a proximal end 294B. Further, each handle 292 is disposed at the proximal end 294B of the corresponding second vertical wall 246. Each handle 292 includes a flange 298 which protrudes away from the mutually opposite second vertical wall 246. In some examples, each flange 298 in the second vertical wall 246 is configured to detachably couple to the opening 260 in the corresponding first vertical wall 240 to secure the inner frame 236 to the outer frame 234. In some examples, the handle 292 is further configured to be pressed to decouple the flange 298 from the opening 260 and pulled to release the inner frame 236 from the outer frame 234.

Figure 3:
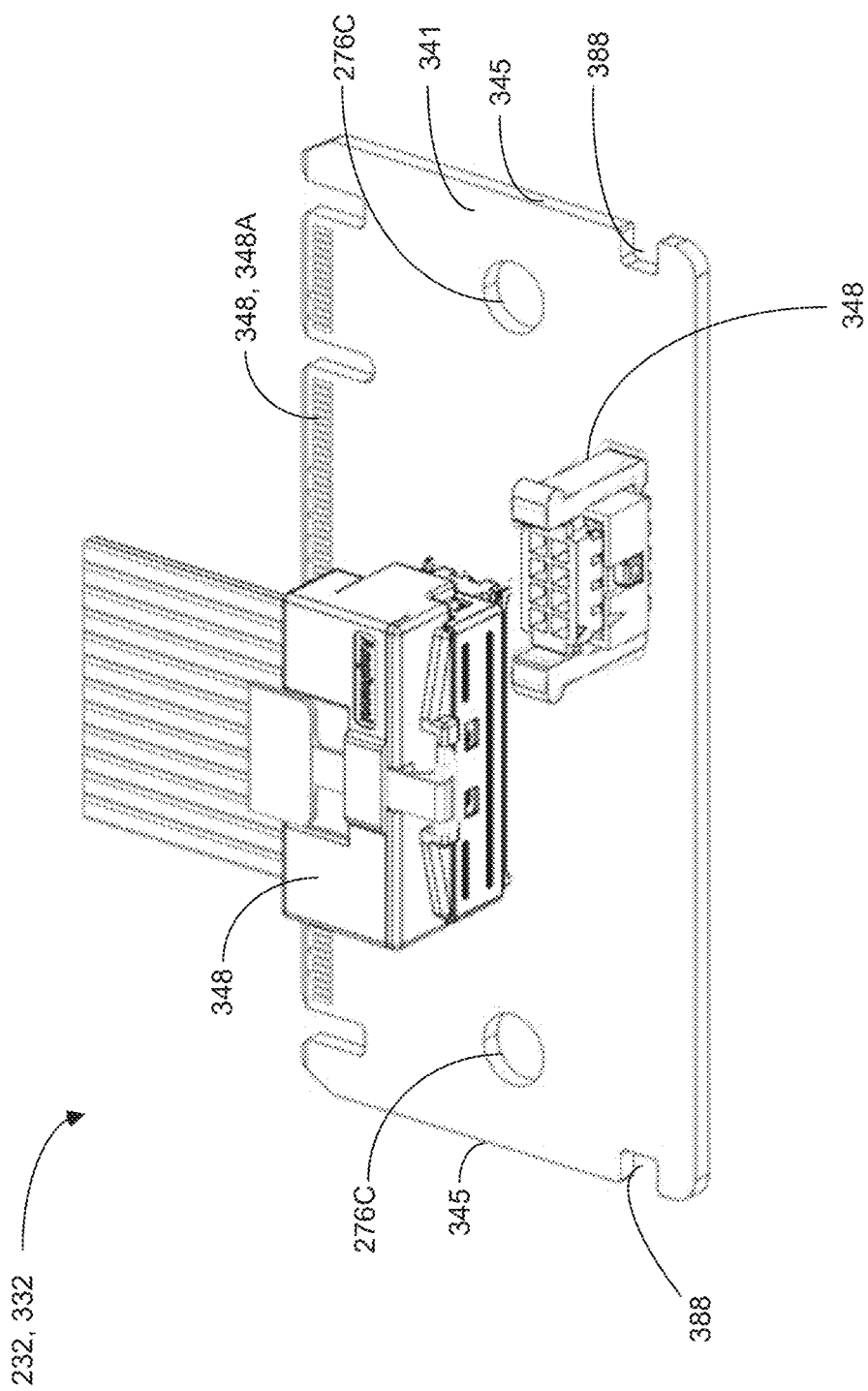
FIG. 3 illustrates a perspective side view of an electronic module having a first form factor according to an example of the present disclosure.

FIG. 3 depicts a perspective side view of an electronic module 232, for example, a first electronic module 332 having a first form factor. In some examples, the first electronic module 332 is a pass-through board controller open compute platform (OCP) module. The first electronic module 332 includes a substrate 341 and a set of electrical connectors 348 (or first electrical connectors). The substrate 341 includes a set of grooves 388 and a set of holes 276C. Each groove of the set of grooves 388 is formed on a corresponding side portion of a set of peripheral side portions 345 of the substrate 341. In some examples, each groove 388 has a dimension (e.g., width, height, and length) that is equal to a dimension of the rib 288 (as shown in FIG. 2E). Further, each hole of the set of holes 356 is formed between the set of peripheral side portions 345 of the substrate 341 and configured to align with a corresponding first mounting fastener 258A. In some examples, one electrical connector 348A of the electrical connector 348 is a golden finger type electrical connector. It may be noted herein, the pass-through board controller OCP module is a standard electronic module and hence it is not discussed in detail here. Such nondescription of the pass-through board controller OCP module should not be construed as a limitation of the present disclosure.

FIG. 4A depicts a perspective side view of the electronic module 232, for example, the first electronic module 332 of FIG. 3 removably installed in the inner frame 236 of FIG. 2E. In some examples, the first electronic module 332 is horizontally translated along a first direction 10 into the module mounting bay 286 of the inner frame 236 to removably install the first electronic module 332 in the inner frame 236. In such examples, the set of second vertical walls 246 of the inner frame 236 slidably receives a portion of the first electronic module 332 upon the horizontal translation of the first electronic module 332 into the module mounting bay 286 of the inner frame 236. More particularly, the module engagement rails 296 in the inner frame 236 first receives the set of peripheral side portions 345 of the first electronic module 332 and later the beam 244 in the inner frame 236 is bent along one of a clockwise direction 30 or an antilock wise direction 40 to align and engage the rib 288 in each second vertical wall 246 of the inner frame 236 with a corresponding groove 388 in the first electronic module 332, thereby removably installing and securing the first electronic module 332 in the inner frame 236. Thus, the first electronic module 332 is removably installed and secured in the inner frame 236 without a need for any tools. In some examples, the portion of the first electronic module 332 having a length of at least 117 mm is installed in the inner frame 236.

Figure 4B:
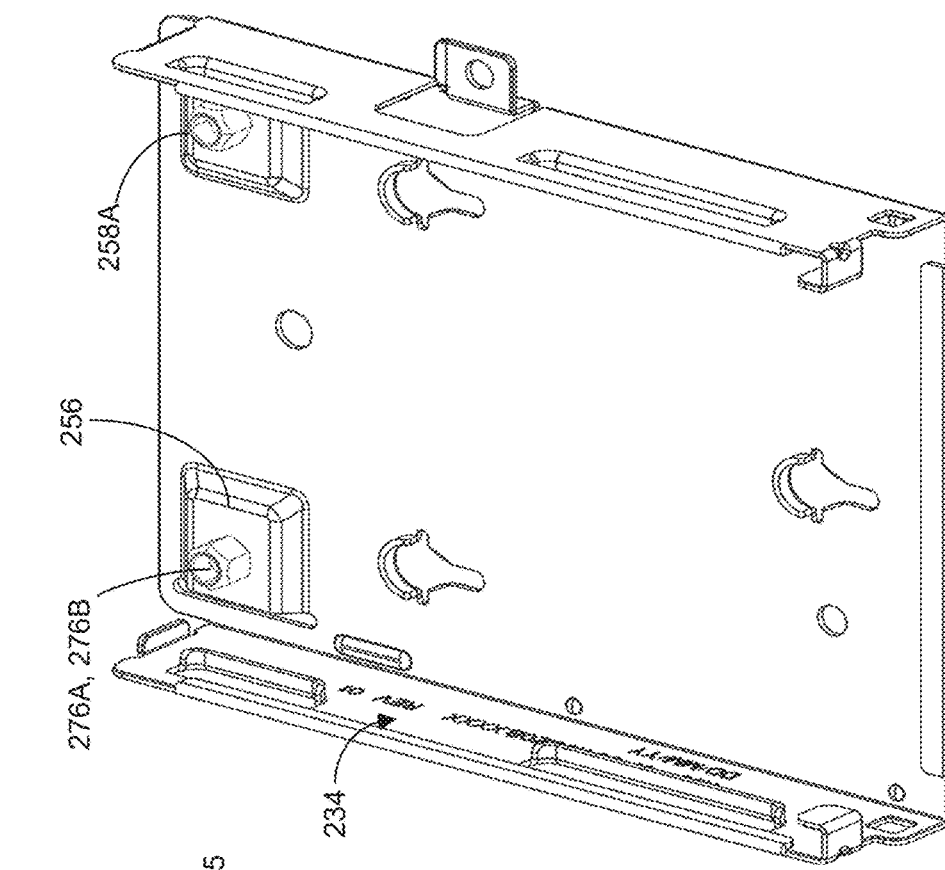
FIG. 4B illustrates a perspective side view of the outer frame of FIG. 2A having the first mounting fastener of FIG. 2B according to an example of the present disclosure.
Figure 4A:
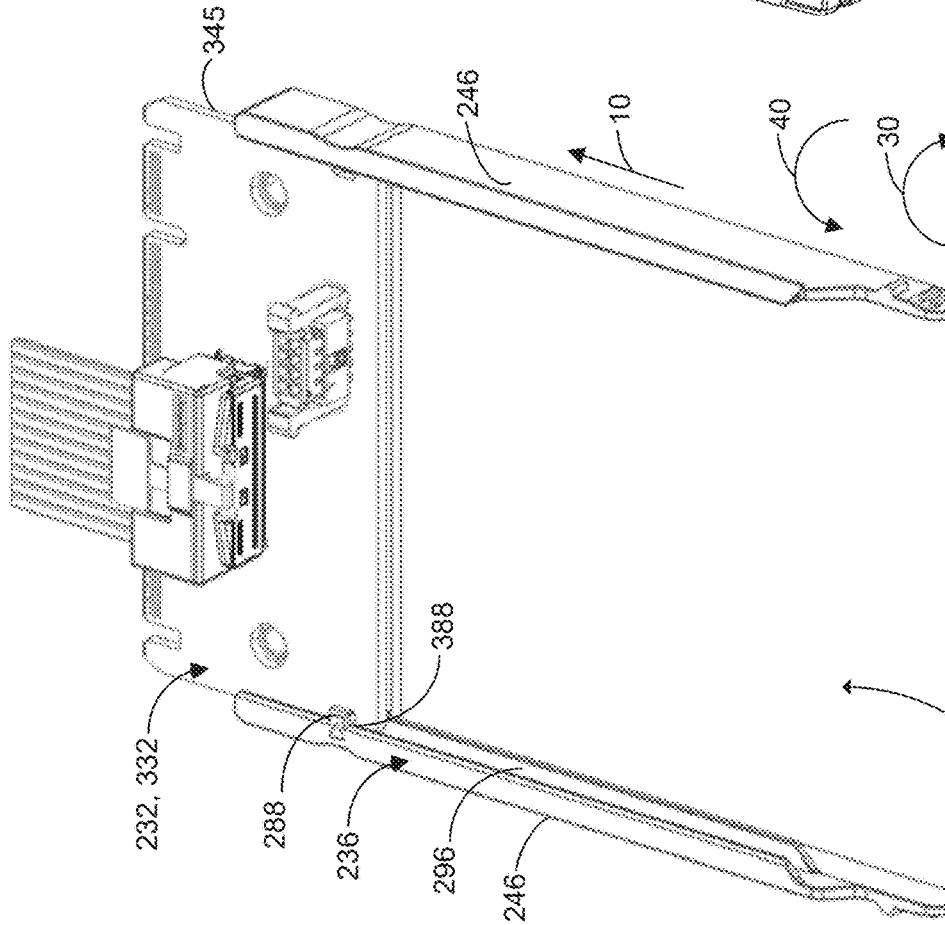
FIG. 4A illustrates a perspective side view of the electronic module of FIG. 3 removably installed in the inner frame of FIG. 2E according to an example of the present disclosure.

FIG. 4B depicts a perspective side view of the outer frame 234 of FIG. 2A having a first mounting fastener 258A of a set of mounting fasteners 258. In some examples, the first mounting fastener 258A is disposed on a corresponding mounting feature of a pair of mounting features 256 such that the body portion 274B of each first mounting fastener 258A is aligned to the opening 276A in the first mounting feature 256. Further, each first mounting fastener 258A is fastened to couple to the corresponding first mounting feature 256. In such examples, the hole 276B formed in each first mounting fastener 258A faces a top surface and is further configured to receive a corresponding second mounting fastener 258B.

Figure 4C:
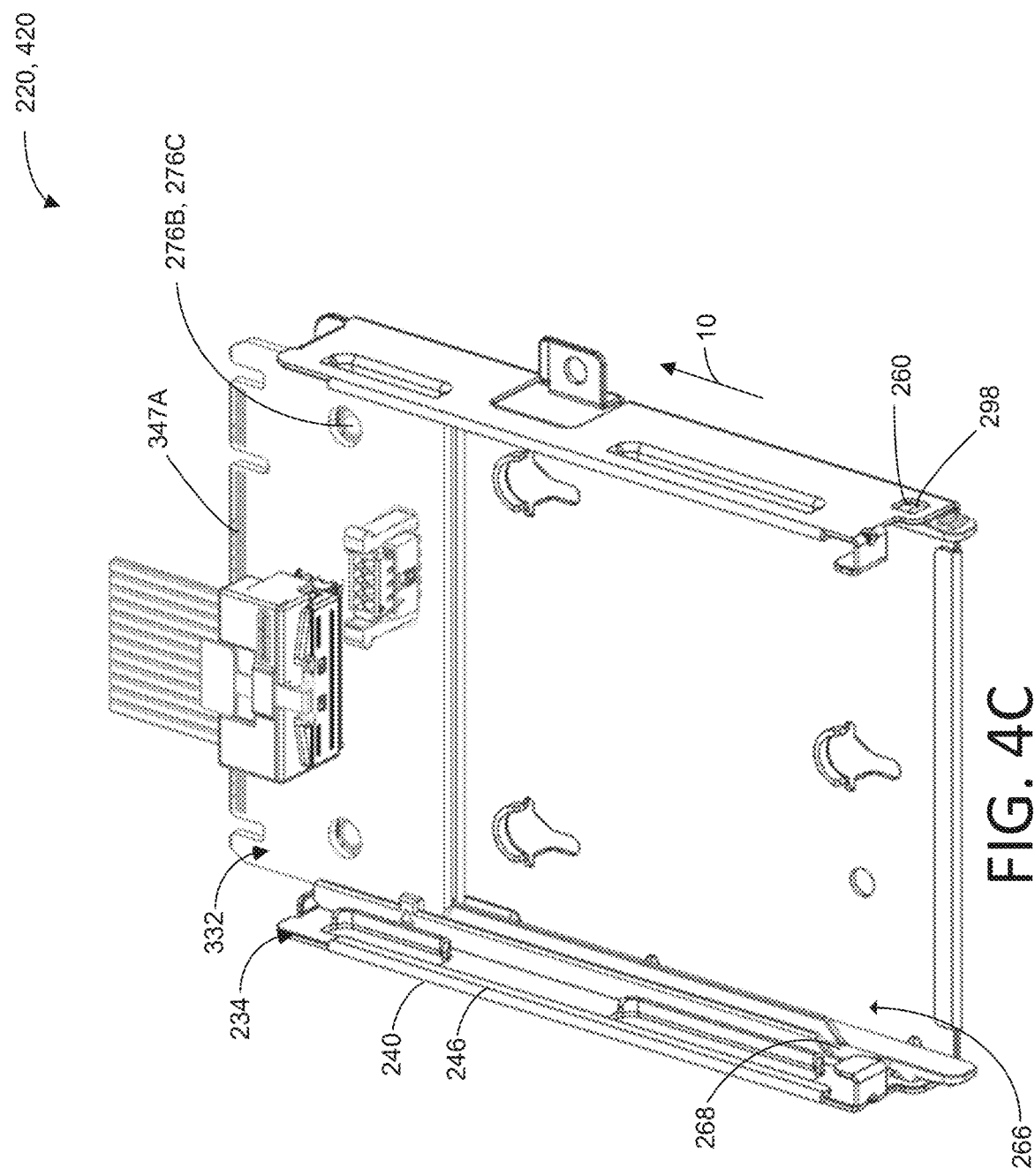
FIG. 4C illustrates a perspective side view of a combination of the electronic module and the inner frame of FIG. 4A installed in the outer frame of FIG. 4B to form a support cage according to an example of the present disclosure.

FIG. 4C depicts a perspective side view of a combination of the first electronic module 332 and the inner frame 236 of FIG. 4A installed in the outer frame 234 of FIG. 4B to form a support cage 220, for example, a first support cage 420. In some examples, the inner frame 236 is horizontally translated along the first direction 10 into the frame mounting bay 266 of the outer frame 234 such that the set of second vertical walls 246 contacts the set of vertical ridges 254 and the first electronic module 332 contacts the first mounting fastener 258A. In particular, the set of first vertical walls 240 of the outer frame 234 slidably receives a set of second vertical walls 246 of the inner frame 236 upon the horizontal translation of the inner frame 236 into the frame mounting bay 266 of the outer frame 234. More particularly, the frame holding rails 268 in the outer frame 234 first receives the set of second vertical walls 246 of the inner frame 236 and later the opening 260 in the outer frame 234 is engaged to a corresponding flange 298 in the inner frame 236, thereby removably installing and securing the inner frame 236 in the outer frame 234. In other words, the inner frame 236 is horizontally translated until the flange 298 of the outer frame 234 is engaged into the corresponding opening 260 and restricts the further horizontal translation of the inner frame 236. Further, each hole among the set of holes 276C in the first electronic module 332 is aligned to the hole 276B formed in the corresponding first mounting fastener 258A. In such examples, the hole 276B formed in each first mounting fastener 258A and each hole among the set of holes 276C in the first electronic module 332 face a top surface of the first support cage 420 and is further configured to receive a corresponding second mounting fastener 258B to secure the first electronic module 332 to the first support cage 420. Further, the set of vertical ridges 254 contacting the set of second vertical walls 246 constrains a vertical position of the first electronic module 332 installed in the inner frame 236 to align the electrical connector 348A of the first electronic module 332 with a complementary electrical connector (not shown) of a primary system board (not shown). Accordingly, the inner frame 236 is removably installed and secured in the outer frame 234 without the need for any tools. Since the outer frame 234 has such modular feature (e.g., the mounting feature 256), the same support cage 220 may be used to install the first electronic module 332 or the second electronic module 552 (explained in detail below) to the information processing device.

Figure 5:
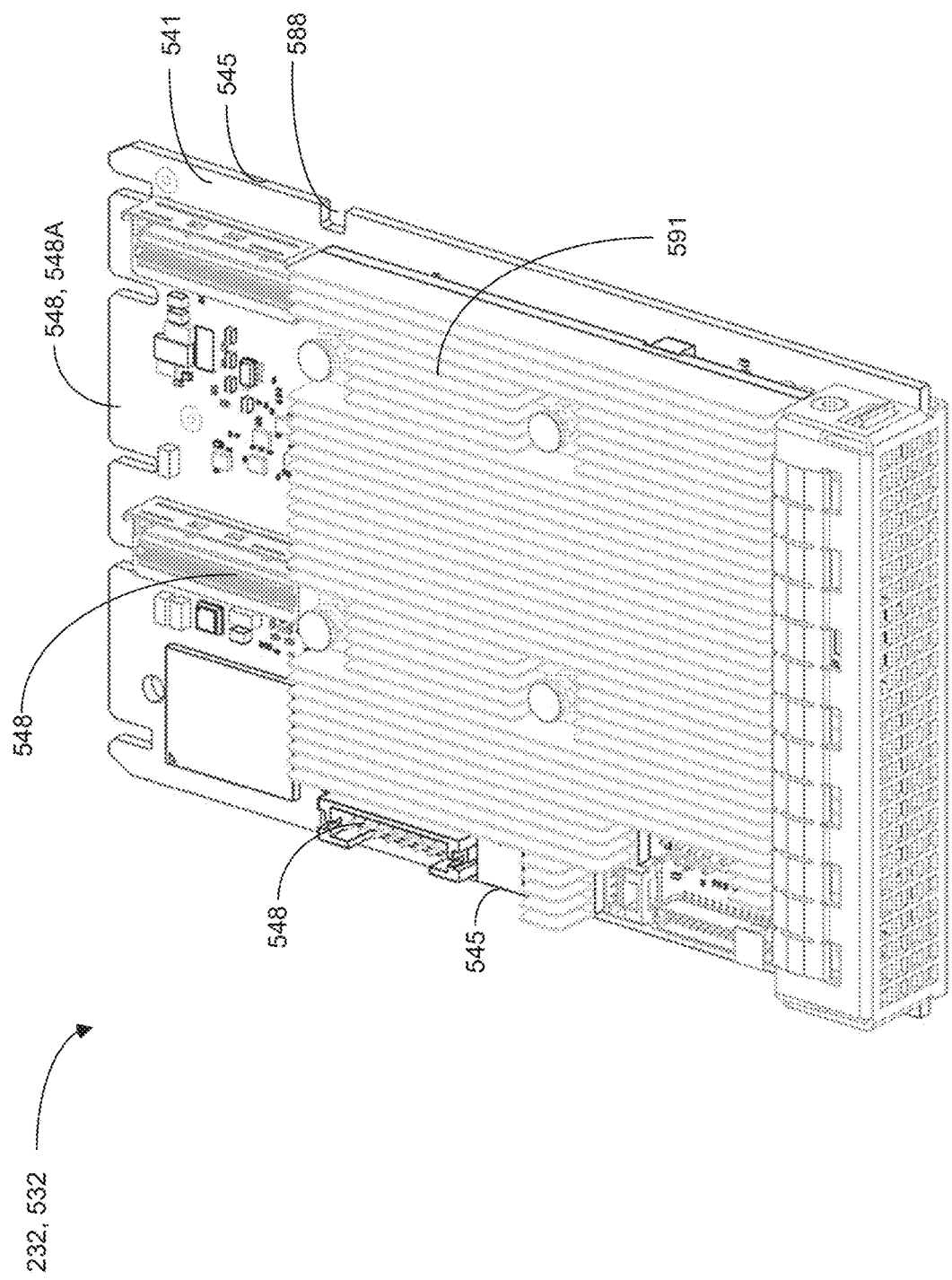
FIG. 5 illustrates a perspective side view of another electronic module having a second form factor according to an example of the present disclosure.
Figure 6:
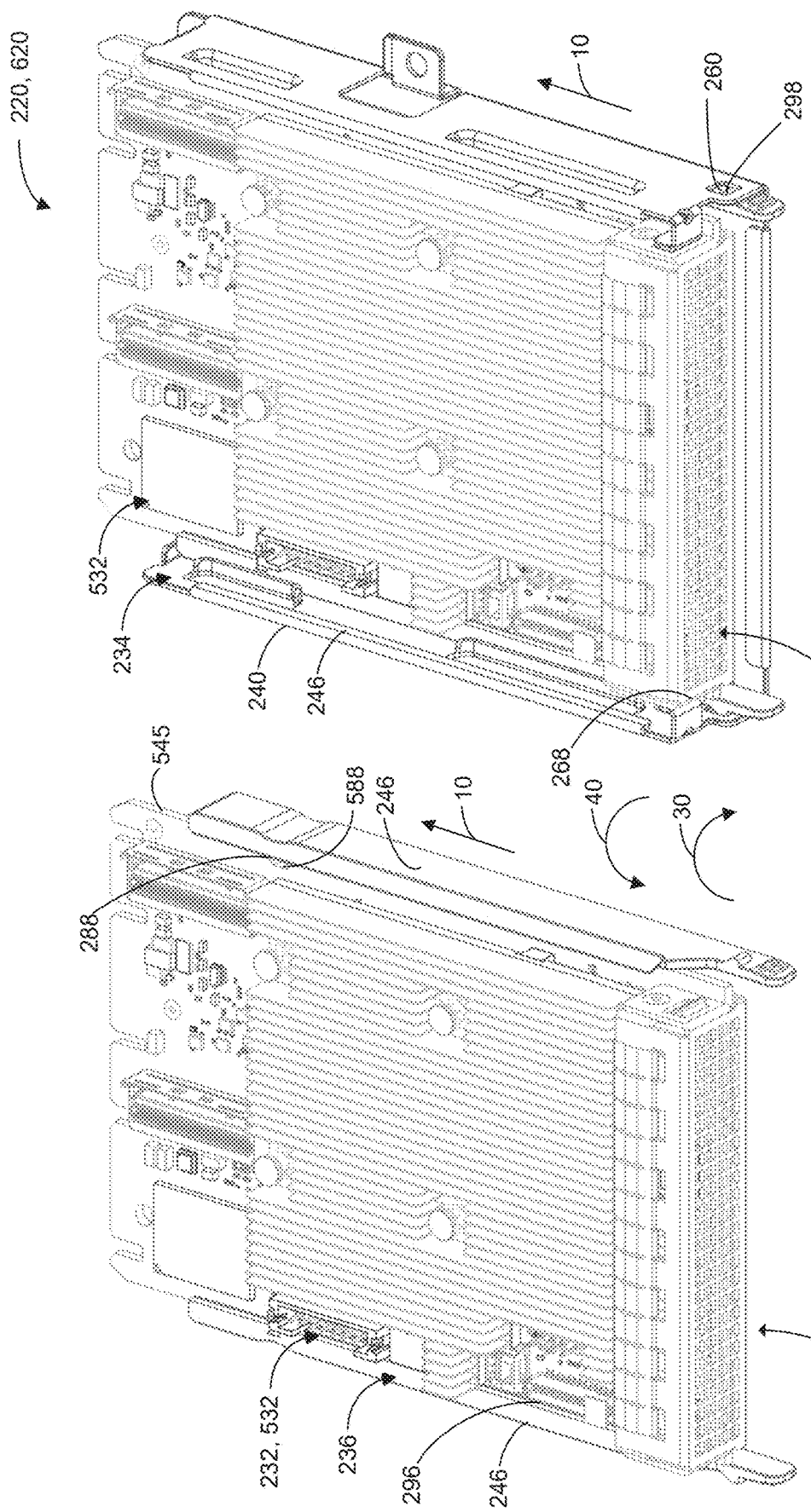
FIG. 6A illustrates a perspective side view of the other electronic module of FIG. 5 installed in the inner frame of FIG. 2E according to another example of the present disclosure.
FIG. 6B illustrates a perspective side view of a combination of the other electronic module and the inner frame of FIG. 6A installed in the outer frame of FIG. 2A to form a support cage according to another example of the present disclosure.

FIG. 5 depicts a perspective side view of an electronic module 232, for example, a second electronic module 532 having a second form factor. In some examples, the second electronic module 532 is a type-o controller open compute platform (OCP) module. The second electronic module 532 includes a substrate 541 and a set of electrical connectors 548 (or first electrical connectors). In some examples, the substrate 541 includes a set of grooves 588. Each groove of the set of grooves 588 is disposed on a corresponding side portion of a set of peripheral side portions 545 of the substrate 541. In some examples, each groove 588 has a dimension (e.g., width, height, and length) that is equal to a dimension of the rib 288 (as shown in FIG. 2E) of the inner frame 236. In the example of FIG. 5, the second electronic module 532 further includes a heat sink 591 disposed on the portion of the substrate 541. In some examples, one electrical connector 548A of the electrical connector 548 is a golden finger type electrical connector. The type-o controller OCP module is a standard electronic module and hence it is not discussed in detail here. Such nondescription of the type-o controller OCP module should not be construed as a limitation of the present disclosure.

FIG. 6A depicts a perspective side view of the electronic module 232, for example, the second electronic module 532 of FIG. 5 removably installed in the inner frame 236 of FIG. 2E. In some examples, the second electronic module 532 is horizontally translated along a first direction 10 into the module mounting bay 286 of the inner frame 236 to removably install the second electronic module 532 in the inner frame 236. In such examples, the set of second vertical walls 246 of the inner frame 236 slidably receives a portion of the second electronic module 532 upon the horizontal translation of the second electronic module 532 into the module mounting bay 286 of the inner frame 236. More particularly, the module engagement rails 296 in the inner frame 236 first receives the set of peripheral side portions 545 of the second electronic module 532 and later the beam 244 in the inner frame 236 is bent along one of a clockwise direction 30 and/or an antilock wise direction 40 to align and engage the rib 288 in each second vertical wall 246 of the inner frame 236 with a corresponding groove 588 in the second electronic module 532, thereby removably installing and securing the second electronic module 532 in the inner frame 236. Thus, the second electronic module 532 is removably installed and secured in the inner frame 236 without a need for any tools. In some examples, the portion of the second electronic module 532 having a length of at least 117 mm is installed in the inner frame 236.

FIG. 6B depicts a perspective side view of a combination of the second electronic module 532 and the inner frame 236 of FIG. 6A installed in the outer frame 234 of FIG. 2A to form a support cage 220, for example, a second support cage 620. In some examples, the inner frame 236 is horizontally translated along the first direction 10 into the frame mounting bay 266 of the outer frame 234 such that the set of second vertical walls 246 contacts the set of vertical ridges 254 and the first electronic module 532 contacts the set of mounting features 256. In particular, the set of first vertical walls 240 of the outer frame 234 slidably receives a set of second vertical walls 246 of the inner frame 236 upon the horizontal translation of the inner frame 236 into the frame mounting bay 266 of the outer frame 234. More particularly, the frame holding rails 268 in the outer frame 234 first receives the set of second vertical walls 246 of the inner frame 236 and later the opening 260 in the outer frame 234 is engaged to a corresponding flange 298 in the inner frame 236, thereby removably installing and securing the inner frame 236 in the outer frame 234. In other words, the inner frame 236 is horizontally translated until the flange 298 of the outer frame 234 is engaged into the corresponding opening 260 and restricts the further horizontal translation of the inner frame 236. Further, the set of vertical ridges 254 contacting the set of second vertical walls 246 constrains a vertical position of the second electronic module 532 installed in the inner frame 236 to align the electrical connector 548A of the second electronic module 532 with a complementary electrical connector (not shown) of a primary system board (not shown). Accordingly, the inner frame 236 is removably installed and secured in the outer frame 234 without the need for any tools. Since the outer frame 234 has such modular feature (e.g., the mounting feature 256), the same support cage 220 may be used to install the first electronic module 332 or the second electronic module 552 to the information processing device.

FIG. 7 depicts a perspective side view of an information processing device 700. In some examples, the information processing device 700 has a chassis 702, a primary system board 704, one or more processors (not shown), power supply units 708, a riser cage unit 710, an external electronic module 712 e.g., an external open compute platform (OCP) module, storage drives 714, one or more cooling units (not shown), and a set of complementary engagement elements 752 (or a set of first engagement elements such as spools) disposed around a middle region 701 of the chassis 702.

Figure 8C:
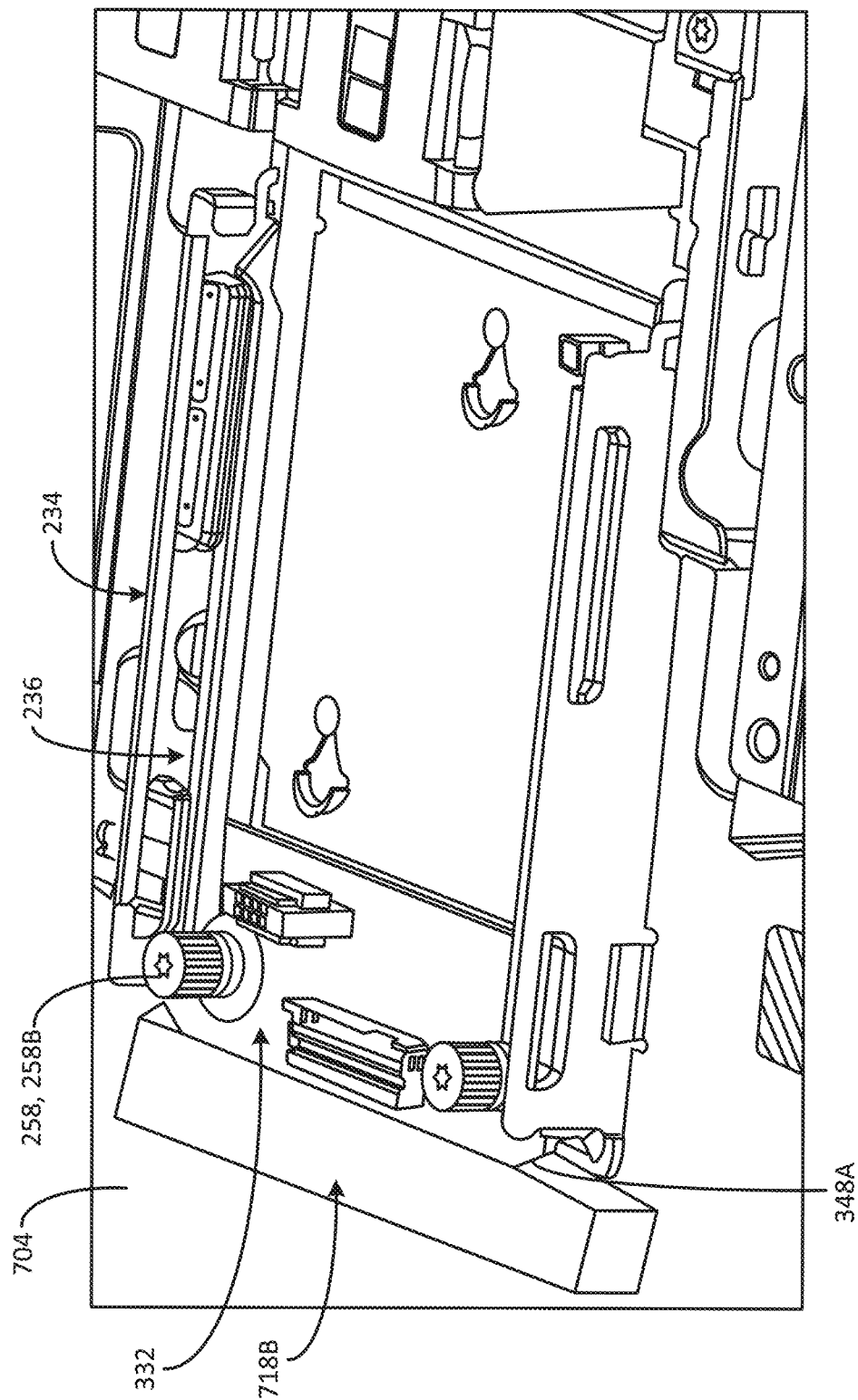

The chassis 702 includes a front panel 722, a rear panel 724, a base 726, and a pair of support walls 728. The primary system board 704 is disposed on and coupled to the base 726 of the chassis 702. The primary system board 704 includes one or more complementary connectors 718 (or one or more second electrical connectors) that is complementary to the one or more electrical connectors 348A, 548A (or one or more first electrical connectors, as shown in FIGS. 8C and 9C) of a corresponding electronic module 300, 500, respectively. In some examples, the one or more second electrical connectors 718B among the one or more second electrical connectors 718 are disposed to be inaccessible by insertion of the electronic module 300, 500 from the front panel 722 or from the rear panel 724 of the chassis 702. The power supply units 708 are disposed at the rear panel 724 of the chassis 702 and configured to connect with the corresponding complementary electrical connectors 718A among the one or more second electrical connectors 718, such as power sockets to supply the low voltage power to the primary system board 704 and other electronic components of the information processing device 700. Further, the riser cage unit 710 is configured to support a riser card and provide the primary system board 704 with an option for adding expansion cards to the information processing device 700. The external electronic module 712 is a Networking (Ethernet) module that is configured to allow the information processing device 700 to establish a connection with a removable electronic module such as a transceiver. In some examples, the external electronic module 712 and the riser cage unit 710 may be positioned at the rear panel 724 and disposed one above another on the chassis 702. In particular, the external electronic module 712 may be disposed in a bay 730 defined by a support structure (not labeled) located at the rear panel 724 by allowing the external electronic module 712 to be inserted via an opening (not shown) defined in the rear panel 724. In such examples, when the external electronic module 712 is disposed in the bay 730, the external electronic module 712 may establish an electrical connection with at least one complementary connector such as 4C or 4C+ connectors of the one or more complementary electrical connectors 718. Since the external electronic module 712 is disposed through the rear panel 724 there is no requirement to have a large keep-out zone in the chassis 702 or the primary system board 704 to allow for large amounts of horizontal translation of the external electronic module 712 to allow the external electronic module 712 to be disposed within the bay 730 and electrically connect with the information processing device 700. The storage drives 714 are positioned at the front panel 722 of the chassis 702. The set of first engagement elements 752 (or complementary engagement elements) such as spools are disposed around the middle region 701 of the chassis 702. In the illustrated example, the set of first engagement elements 752 is attached to the primary system board 704. In some other examples, the set of first engagement elements 752 may be attached to the chassis 702. In some examples, the primary system board 704 may further include a set of support elements 733 disposed containing the set of first engagement elements 752. The support cage 220 is disposed in the middle region 701 such that the set of support elements 733 constrains a lateral movement of the support cage 220 along the fifth direction 50.

FIG. 8A depicts a perspective side view of the support cage 220 e.g., a first support cage 420 of FIG. 4C mounted on the information processing device 700 of FIG. 7. It may be noted herein that the support cage 220 is shown without an electronic module 332 mounted therein for ease of illustration of other elements of the support cage 220 and the information processing device 700, and such non-illustration of the electronic module 332 should not be construed as a limitation of the present disclosure. The support cage 220 is disposed in the middle region 701 such that the set of first vertical walls 240 of the support cage 220 is constrained by the set of support elements 733. Further, the first hole portion 242A of each second engagement element 242 in the support cage 220 contacts a corresponding first engagement element of the set of first engagement elements 752. In such examples, the support cage 220 is positioned in a released condition. In other words, the second hole portion 242B of each of the set of second engagement elements 242 are not engaged to a corresponding engagement element of the set of first engagement elements 752, thus the support cage 220 may be lifted or removed from the chassis 702.

FIGS. 8B-8C illustrate perspective side views of the support cage 220 of FIG. 8A attached to a chassis 702 of the information processing device 700 of FIG. 7 and the electronic module 332 of FIG. 3 connected to a primary system board 704 of the information processing device 700 of FIG. 7. It may be noted herein that in FIG. 8B, the support cage 220 is shown without the electronic module 332 mounted therein for ease of illustration of other elements of the support cage 220 and the information processing device 700. Whereas, in FIG. 8C, the support cage 220 is shown with the electronic module 332 installed in the inner frame 236. In such examples, the electronic module 332 is further secured to the outer frame 234. In particular, the second mounting fastener 258B may be engaged to the first mounting fastener 258A via the electronic component 332 to couple the electronic module 332 to the outer frame 234, thereby securing the electronic module 332 to the information processing device 700. In some examples, in an installed state of the inner frame 236 to the outer frame 234 and the electronic module 332 to the inner frame 236, and the support cage 220 mounted in the chassis 702, the support cage 220 is horizontally translated along a first direction 10 to attach the support cage 220 to the primary system board 704 by engaging the second set of engagement elements 242 with the first set of engagement elements 752 and connecting the first electrical connector 348A to the second electrical connector 718B. In particular, the outer frame 234 is horizontally translated along the first direction 10 such that the set of first engagement elements 752 is engaged to the second hole portion 242B of the set of second engagement elements 242 to attach the support cage 220 to the information processing device 700. Further, as the support cage 220 is horizontally translated along the first direction 10, the electrical connector 348A of the electronic module 332 is simultaneously connected to the complementary electrical connector 718B of the information processing device 700. In some examples, the support cage 220 is further secured to the chassis 702 of the information processing device 700. In particular, the mounting pin 278 may be engaged to the mounting element 270 of the outer frame 234 to couple the outer frame 234 to the chassis 702, thereby securing the support cage 220 to the information processing device 700.

In some examples, in installed state of the inner frame 236 to the outer frame 234 and the electronic module 332 to the inner frame 236, and the support cage mounted in the attached condition with the chassis 702, the mounting pin 278 may be disengaged from the mounting element 270 of the outer frame 234 to decouple the outer frame 234 from the chassis 702, thereby releasing the support cage 220 from the information processing device 700. Later, the support cage 220 is horizontally translated along a second direction 20 opposite to the first direction 10 to release the support cage 220 from the primary system board 704 by disengaging the second set of engagement elements 242 from the first set of engagement elements 752 and disconnecting the first electrical connector 348A from the second electrical connector 718. In particular, the outer frame 234 is horizontally translated along the second direction 20 such that the set of first engagement elements 752 is disengaged from the second hole portion 242B of the set of second engagement elements 242 and engaged with the first hole portion 242A of the set of second engagement elements 242 so as to allow release of the support cage 220 from the information processing device 700. Further, as the support cage 220 is horizontally translated along the second direction 20, the electrical connector 348A of the electronic module 332 is simultaneously disconnected from the complementary electrical connector 718B of the information processing device 700.

In some examples, the support cage 220 is translated 7 mm to transition between attached and released conditions of the support cage 220 to the information processing device 700. In some other examples, a length of the portion of the first electronic module 332 is at least 16 times longer than a distance of horizontal translation of the support cage 220 when transitioning between attached and released conditions of the support cage 220 to the information processing device 700.

Since the electronic module 332 is removably installed when the electronic module 332 is positioned exterior to the information processing device 700, and further since the support cage 220 is horizontally translated to a very little distance (e.g., around 7 mm) to attach the support cage 220 to the information processing device 700 and to electrically connect the electronic module 332 to the information processing device 700, the chassis 702 or the primary system board 704 may not require to have a large keep-out zone at the middle region 701 to allow for large amounts of horizontal translation of the electronic module 332 to electrically connect with the information processing device 700. Thus, the support cage 720 of the present disclosure may allow the electronic module 332 to be provided in the middle region 701 of the information processing device 700 and to be electrically connected to the information processing device 700 without requiring the electronic module 332 to be horizontally translated for a large distance (e.g., around 117 mm) in the information processing device 700 to electrically connect to the information processing device 700. Further, the additional electronic module 332 disposed in the middle region 701 of the chassis 702 may help in enhancing the performance of the information processing device 700.

FIG. 9A depicts a perspective side view of the support cage 220 e.g., a second support cage 620 of FIG. 6B mounted on the information processing device 700 of FIG. 7. It may be noted herein that the support cage 220 is shown without an electronic module 532 mounted therein for ease of illustration of other elements of the support cage 220 and the information processing device 700, and such non-illustration of the electronic module 532 should not be construed as a limitation of the present disclosure. The support cage 220 is disposed in the middle region 701 such that the set of first vertical walls 240 of the support cage 220 is constrained by the set of support elements 733. Further, the first hole portion 242A of each second engagement element 242 in the support cage 220 contacts a corresponding first engagement element of the set of first engagement elements 752. In such examples, the support cage 220 is positioned in a released condition. In other words, the second hole portion 242B of each of the set of second engagement elements 242 are not engaged to a corresponding engagement element of the set of first engagement elements 752, thus the support cage 220 may be lifted or removed from the chassis 702.

Figure 9B:
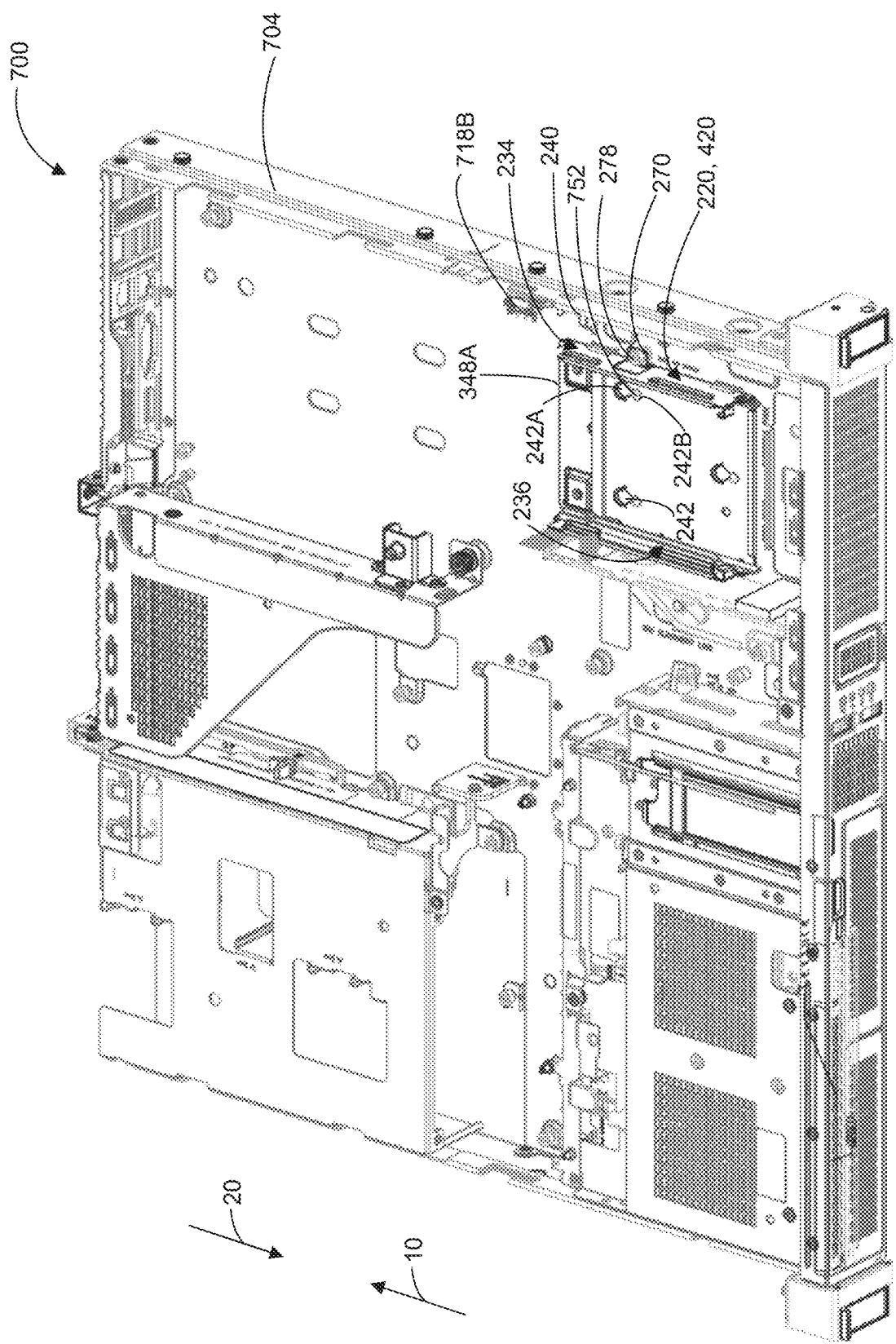
FIGS. 9B-9C illustrate perspective side views of the support cage of FIG. 9A attached to a chassis of the information processing device of FIG. 7 and the other electronic module of FIG. 5 connected to a primary system board of the information processing device of FIG. 7 according to an example of the present disclosure.
Figure 9C:
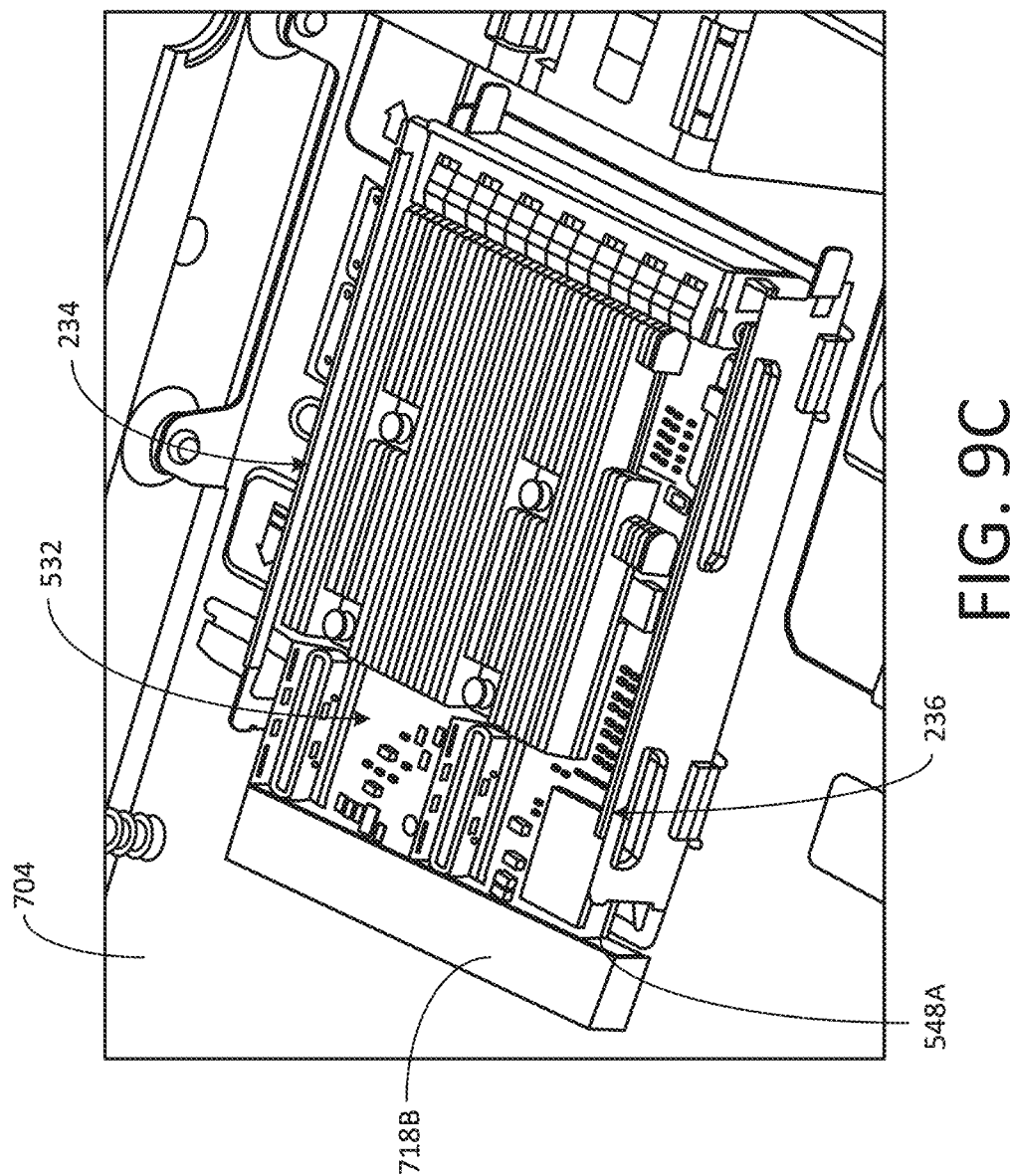

FIGS. 9B-9C illustrate perspective side views of the support cage 220 of FIG. 9A attached to a chassis 702 of the information processing device 700 of FIG. 7 and the electronic module 532 of FIG. 5 connected to a primary system board 704 of the information processing device 700 of FIG. 7. It may be noted herein that in FIG. 8B, the support cage 220 is shown without the electronic module 532 mounted therein for ease of illustration of other elements of the support cage 220 and the information processing device 700. Whereas, in FIG. 8C, the support cage 220 is shown with the electronic module 532 installed in the inner frame 236. In such examples, the electronic module 532 is further secured to the outer frame 234. In particular, the second mounting fastener 258B may be engaged to the first mounting fastener 258A via the electronic module 532 to couple the electronic module 532 to the outer frame 234, thereby securing the electronic module 532 to the information processing device 700. In some examples, in an installed state of the inner frame 236 to the outer frame 234 and the electronic module 532 to the inner frame 236, and the support cage mounted in the chassis 702, the support cage 220 is horizontally translated along a first direction 10 to attach the support cage 220 to the primary system board 704 by engaging the second set of engagement elements 242 with the first set of engagement elements 752 and connecting the first electrical connector 548A to the second electrical connector 718B. In particular, the outer frame 234 is horizontally translated along the first direction 10 such that the set of first engagement elements 752 is engaged to the second hole portion 242B of the set of second engagement elements 242 to attach the support cage 220 to the information processing device 700. Further, as the support cage 220 is horizontally translated along the first direction 10, the electrical connector 548A of the electronic module 532 is simultaneously connected to the complementary electrical connector 718B of the information processing device 700.

In some examples, in installed state of the inner frame 236 to the outer frame 234 and the electronic module 532 to the inner frame 236, and the support cage mounted in the attached condition with the chassis 702, the mounting pin 278 may be disengaged from the mounting element 270 of the outer frame 234 to decouple the outer frame 234 from the chassis 702, thereby releasing the support cage 220 from the information processing device 700. Later, the support cage 220 is horizontally translated along a second direction 20 opposite to the first direction 10 to release the support cage 220 from the primary system board 704 by disengaging the second set of engagement elements 242 from the first set of engagement elements 752 and disconnecting the first electrical connector 548A from the second electrical connector 718. In particular, the outer frame 234 is horizontally translated along the second direction 20 such that the set of first engagement elements 752 is disengaged from the second hole portion 242B of the set of second engagement elements 242 and engaged with the first hole portion 242A of the set of second engagement elements 242 so as to allow release of the support cage 220 from the information processing device 700. Further, as the support cage 220 is horizontally translated along the second direction 20, the electrical connector 548A of the electronic module 532 is simultaneously disconnected from the complementary electrical connector 718B of the information processing device 700.

In some examples, the support cage 220 is translated 7 mm to transition between attached and released conditions of the support cage 220 to the information processing device 700. In some other examples, a length of the portion of the first electronic module 532 is at least 16 times longer than a distance of horizontal translation of the support cage 220 when transitioning between attached and released conditions of the support cage 220 to the information processing device 700.

Since the electronic module 532 is removably installed when the electronic module 532 is positioned exterior to the information processing device 700, and further since the support cage 220 is horizontally translated to a very little distance (e.g., around 7 mm) to attach the support cage 220 to the information processing device 700 and to electrically connect the electronic module 532 to the information processing device 700, the chassis 702 or the primary system board 704 may not require to have a large keep-out zone at the middle region 701 to allow for large amounts of horizontal translation of the electronic module 532 to electrically connect with the information processing device 700. Thus, the support cage 720 of the present disclosure may allow the electronic module 532 to be provided in the middle region 701 of the information processing device 700 and to be electrically connected to the information processing device 700 without requiring the electronic module 532 to be horizontally translated for a large distance (e.g., around 117 mm) in the information processing device 700 to electrically connect to the information processing device 700. Further, the additional electronic module 532 disposed in the middle region 701 of the chassis 702 may help in enhancing the performance of the information processing device 700.

Figure 10:
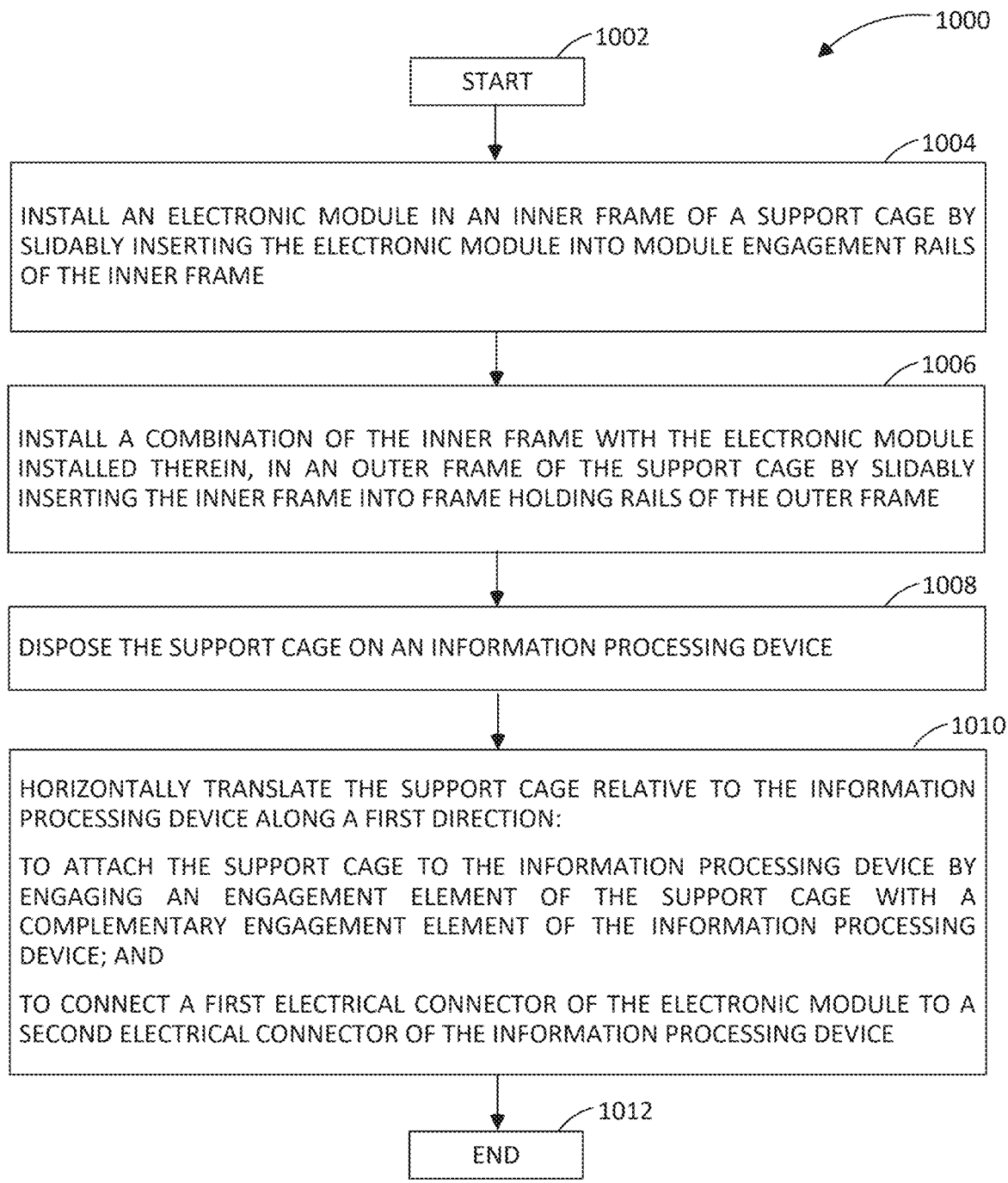
FIG. 10 is a flowchart depicting a method of detachably coupling a support cage to a chassis of an information processing device and an electronic module to a primary system board of the information processing device according to an example of the present disclosure.

FIG. 10 depicts a flow depicting a method 1000 of detachably coupling a support cage to a chassis of an information processing device and an electronic module to a primary system board of the information processing device. It may be noted herein that the method 1000 is described in conjunction with FIGS. 2A-2D, 3, 4A-4B, 5, 6A-6B, 7, 8A-8C, and 9A-9C for example. The method 1000 starts at block 1002 and continues to block 1004.

At block 1004, the method 1000 includes installing an electronic module in an inner frame of a support cage by slidably inserting the electronic module into module engagement rails of the inner frame. The method 1000 continues to block 1006. At block 1006, the method 1000 includes installing a combination of the inner frame with the electronic module installed therein, in an outer frame of the support cage by slidably inserting the inner frame into frame holding rails of the outer frame. The method 1000 continues to block 1008. At block 1008, the method 1000 includes disposing the support cage on an information processing device. The method 1000 continues to block 1010. At block 1010, the method 1000 includes horizontally translating the support cage relative to the information processing device along a first direction: to attach the support cage to the information processing device by engaging an engagement element of the support cage with a complementary engagement element of the information processing device, and to connect a first electrical connector of the electronic module to a second electrical connector of the information processing device.

In some examples, the method 1000 further includes horizontally translating the support cage relative to the information processing device along a second direction opposite to the first direction: to release the support cage from the information processing device by disengaging the engagement element from the complementary engagement element, and to disconnect the first electrical connector from the second electrical connector. The method ends at block 1012.

In the foregoing description, numerous details are set forth to provide an understanding of the subject matter disclosed herein. However, implementation may be practiced without some or all these details. Other implementations may include modifications, combinations, and variations from the details discussed above. It is intended that the following claims cover such modifications and variations.

What is claimed is:

1. A support cage for an electronic module of an information processing device, comprising:
   an outer frame comprising:
      a base comprising an engagement element configured to engage with or disengage from a complementary engagement element coupled to the information processing device by horizontal translation of the outer frame relative to the information processing device to detachably couple the support cage to the information processing device; and
      a set of first vertical walls coupled to the base; and
   an inner frame configured to detachably couple to the set of first vertical walls to removably install the inner frame in the outer frame, the inner frame comprising a beam and a set of second vertical walls coupled to the beam, the set of second vertical walls is configured to slidably receive a portion of the electronic module upon a horizontal translation of the electronic module into the inner frame to removably install the electronic module in the inner frame,
   wherein, in an installed state of the inner frame to the outer frame and the electronic module to the inner frame:
      horizontal translation of the support cage along a first direction attaches the support cage to the information processing device by engaging the engagement element with the complementary engagement element and connects an electrical connector of the electronic module to a complementary electrical connector of the information processing device; and
      horizontal translation of the support cage along a second direction opposite to the first direction releases the support cage from the information processing device by disengaging the engagement element from the complementary engagement element and disconnects the electrical connector from the complementary electrical connector.

2. The support cage of claim 1, wherein the inner frame is a flexible frame that is configured to bend to removably install the electronic module in the inner frame.

3. The support cage of claim 1, wherein each wall of the set of second vertical walls comprises a rib configured to engage with a corresponding groove in the electronic module to secure the electronic module to the inner frame.

4. The support cage of claim 1, wherein the base comprises a set of vertical ridges disposed adjacent to the set of first vertical walls and configured to contact the set of second vertical walls of the inner frame and constrain a vertical position of the electronic module installed in the inner frame to align the electrical connector with the complementary electrical connector.

5. The support cage of claim 1, wherein each vertical wall of the set of first vertical walls comprises an opening, wherein each vertical wall of the set of second vertical walls comprises a handle comprising a flange, wherein the flange is configured to detachably couple to the opening to secure the inner frame to the outer frame, and wherein the handle is configured to be pressed to decouple the flange from the opening and pulled to release the inner frame from the outer frame.

6. The support cage of claim 1, wherein one wall of the set of first vertical walls comprises a mounting element configured to be coupled to the information processing device to secure the support cage to the information processing device.

7. The support cage of claim 1, wherein the base comprises a set of mounting fasteners configured to be coupled to the electronic module to secure the electronic module to the support cage.

8. The support cage of claim 1, wherein a length of the portion of the electronic module is at least 16 times longer than a distance of horizontal translation of the support cage when transitioning between attached and released conditions of the support cage to the information processing device.

9. The support cage of claim 1, wherein the portion of the electronic module has a length of at least 117 mm, and wherein the support cage is translated 7 mm to transition between attached and released conditions of the support cage to the information processing device.

10. An information processing device comprising:
    a chassis;
    an electronic module comprising a first electrical connector;
    a primary system board coupled to the chassis and comprising a second electrical connector complementary to the first electrical connector and disposed to be inaccessible by insertion of the electronic module from a front panel or from a rear panel of the chassis;
    a set of first engagement elements attached to the chassis or to the primary system board;
    a support cage comprising:
       an outer frame comprising:
          a base comprising a set of second engagement elements configured to engage with or disengage from the set of first engagement elements by horizontal translation of the outer frame relative to the chassis or to the primary system board to detachably couple the support cage to the information processing device; and
          a set of first vertical walls coupled to the base; and
       an inner frame configured to detachably couple to the set of first vertical walls to removably install the inner frame in the outer frame, the inner frame comprising a beam and a set of second vertical walls coupled to the beam, the set of second vertical walls is configured to slidably receive a portion of the electronic module upon a horizontal translation of the electronic module into the inner frame to removably install the electronic module in the inner frame,
    wherein, in an installed state of the inner frame to the outer frame and the electronic module to the inner frame:
       horizontal translation of the support cage along a first direction attaches the support cage to the chassis or to the primary system board by engaging the set of second engagement elements with the set of first engagement elements and connects the first electrical connector to the second electrical connector, and horizontal translation of the support cage along a second direction opposite to the first direction releases the support cage from the chassis or from the primary system board by disengaging the set of second engagement elements from the set of first engagement elements and disconnects the first electrical connector from the second electrical connector.

11. The information processing device of claim 10, wherein the inner frame is a flexible frame that is configured to bend to removably install the electronic module in the inner frame.

12. The information processing device of claim 10, wherein each wall of the set of second vertical walls comprises a rib configured to engage with a corresponding groove in the electronic module to secure the electronic module to the inner frame.

13. The information processing device of claim 10, wherein the base comprises a set of vertical ridges disposed adjacent to the set of first vertical walls and configured to contact the set of second vertical walls of the inner frame and constrain a vertical position of the electronic module installed in the inner frame to align the first electrical connector with the second electrical connector.

14. The support cage of claim 10, wherein each vertical wall of the set of first vertical walls comprises an opening, wherein each vertical wall of the set of second vertical walls comprises a handle comprising a flange, wherein the flange is configured to detachably couple to the opening to secure the inner frame to the outer frame, and wherein the handle is configured to be pressed to decouple the flange from the opening and pulled to release the inner frame from the outer frame.

15. The information processing device of claim 10, wherein one wall of the set of first vertical walls comprises a mounting element configured to be coupled to the information processing device to secure the support cage to the information processing device, and wherein the base comprises a set of mounting fasteners configured to be coupled to the electronic module to secure the electronic module to the support cage.

16. The information processing device of claim 10, wherein a length of the portion of the electronic module is at least 16 times longer than a distance of horizontal translation of the support cage when transitioning between attached and released conditions of the support cage to the information processing device.

17. The information processing device of claim 10, wherein the portion of the electronic module has a length of at least 117 mm, and wherein the support cage is translated 7 mm to transition between attached and released conditions of the support cage to the information processing device.

18. The information processing device of claim 10, wherein the electronic module is one of a type-o controller open compute platform (OCP) module or a pass-through board controller OCP module, and wherein the primary system board is a host platform module.

* * * * *